US012713103B2

(12) United States Patent
He et al.

(10) Patent No.: US 12,713,103 B2
(45) Date of Patent: Aug. 18, 2026

(54) SUBTITLE PROCESSING METHOD AND APPARATUS OF MULTIMEDIA FILE, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Dan He, Shenzhen (CN); Shuyu Gong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 580 days.

(21) Appl. No.: 18/320,302

(22) Filed: May 19, 2023

(65) Prior Publication Data

US 2023/0291978 A1 Sep. 14, 2023

Related U.S. Application Data

(63) Continuation of application No. PCT/CN2022/113257, filed on Aug. 18, 2022.

(30) Foreign Application Priority Data

Sep. 23, 2021 (CN) .......................... 202111114803.6

(51) Int. Cl.
*H04N 21/488* (2011.01)
*H04N 21/44* (2011.01)

(52) U.S. Cl.
CPC ... *H04N 21/4884* (2013.01); *H04N 21/44008* (2013.01)

(58) Field of Classification Search
None
See application file for complete search history.

(56) References Cited

U.S. PATENT DOCUMENTS

| | | | | |
|---|---|---|---|---|
| 9,946,712 | B2 * | 4/2018 | Shen | H04N 21/4884 |
| 11,017,816 | B2 * | 5/2021 | Ahsan | G11B 27/322 |

(Continued)

FOREIGN PATENT DOCUMENTS

| | | | |
|---|---|---|---|
| CN | 101534377 | A | 9/2009 |
| CN | 103200463 | A | 7/2013 |

(Continued)

OTHER PUBLICATIONS

The World Intellectual Property Organization (WIPO) International Search Report for PCT/CN2022/113257 Nov. 18, 2022 7 Pages (including translation).

(Continued)

*Primary Examiner* — Mushfikh I Alam
(74) *Attorney, Agent, or Firm* — Anova Law Group, PLLC

(57) ABSTRACT

A subtitle processing method includes: playing the multimedia file in response to a play trigger operation, the multimedia file being associated with a plurality of subtitles, a type of the multimedia file being a video file or an audio file, and displaying the plurality of subtitles sequentially in a human-computer interaction interface during playing the multimedia file, a pattern of the plurality of subtitles being related to a content of the multimedia file.

20 Claims, 10 Drawing Sheets

(56) References Cited

U.S. PATENT DOCUMENTS

| | | | | |
|---|---|---|---|---|
| 11,043,244 | B1 * | 6/2021 | Paliwoda | G11B 27/34 |
| 11,895,371 | B1 * | 2/2024 | Aggarwal | H04N 21/8545 |
| 2005/0078221 | A1 * | 4/2005 | Kobayashi | H04N 21/42203 348/600 |
| 2005/0207736 | A1 * | 9/2005 | Seo | H04N 21/4316 386/E9.041 |
| 2006/0098641 | A1 * | 5/2006 | Lee | H04N 21/47 370/476 |
| 2007/0253680 | A1 * | 11/2007 | Mizote | H04N 21/4884 386/230 |
| 2008/0254826 | A1 * | 10/2008 | Kwon | H04N 21/23614 348/E7.001 |
| 2009/0162036 | A1 * | 6/2009 | Fujii | H04N 5/85 386/E5.068 |
| 2009/0231490 | A1 | 9/2009 | Chen et al. | |
| 2010/0260477 | A1 * | 10/2010 | Zhang | H04N 5/278 386/278 |
| 2011/0221873 | A1 | 9/2011 | Eyer | |
| 2014/0086552 | A1 * | 3/2014 | Cheng | H04N 21/4312 386/230 |
| 2014/0140681 | A1 * | 5/2014 | Lee | H04N 21/8455 386/241 |
| 2014/0237495 | A1 * | 8/2014 | Jang | H04N 21/4728 725/12 |
| 2014/0278370 | A1 | 9/2014 | Chen | |
| 2015/0373420 | A1 * | 12/2015 | Liu | H04N 21/4884 725/32 |
| 2016/0269797 | A1 * | 9/2016 | Li | H04N 21/4884 |
| 2020/0007902 | A1 | 1/2020 | Li et al. | |
| 2020/0137456 | A1 * | 4/2020 | Hauon | H04N 21/4662 |
| 2020/0358980 | A1 * | 11/2020 | Tsukagoshi | H04N 21/435 |
| 2020/0359104 | A1 * | 11/2020 | Luo | H04N 21/4884 |
| 2021/0160582 | A1 * | 5/2021 | Gu | H04N 21/4884 |
| 2021/0274262 | A1 * | 9/2021 | Li | H04N 5/278 |
| 2022/0005477 | A1 * | 1/2022 | Ma | G06F 40/58 |
| 2022/0045776 | A1 * | 2/2022 | Choi | G06F 16/783 |
| 2022/0103891 | A1 * | 3/2022 | Xu | H04N 21/2187 |
| 2022/0198141 | A1 * | 6/2022 | Hudson | G06V 10/82 |
| 2022/0391612 | A1 * | 12/2022 | Chakrabarty | G06T 7/248 |
| 2023/0033966 | A1 * | 2/2023 | Pandey | H04N 21/2405 |
| 2023/0038347 | A1 * | 2/2023 | Rajanna | H04N 21/4882 |
| 2023/0046440 | A1 * | 2/2023 | Qi | H04N 21/4884 |
| 2023/0291978 | A1 | 9/2023 | He et al. | |
| 2024/0007718 | A1 * | 1/2024 | Sheng | G06F 16/7844 |
| 2024/0236438 | A1 * | 7/2024 | Kim | H04N 5/278 |

FOREIGN PATENT DOCUMENTS

| | | | |
|---|---|---|---|
| CN | 108055592 | A | 5/2018 |
| CN | 108833990 | A | 11/2018 |
| CN | 108924599 | A | 11/2018 |
| CN | 110198468 | A | 9/2019 |
| CN | 111277910 | A | 6/2020 |
| CN | 112084841 | A | 12/2020 |
| CN | 114286154 | A | 4/2022 |
| KR | 20180038318 | A | 4/2018 |

OTHER PUBLICATIONS

The State Intellectual Property Office of the People's Republic of China (SIPO) Office Action 1 for 202111114803.6 Dec. 27, 2023 12 Pages (including translation).

* cited by examiner

603

How do you know

604

SUBTITLE PROCESSING METHOD AND APPARATUS OF MULTIMEDIA FILE, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2022/113257, entitled "MULTIMEDIA FILE SUBTITLE PROCESSING METHOD AND APPARATUS, ELECTRONIC DEVICE, COMPUTER-READABLE STORAGE MEDIUM, AND COMPUTER PROGRAM PRODUCT" and filed on Aug. 18, 2022, which claims priority to Chinese Patent Application No. 202111114803.6, filed on Sep. 23, 2021, the entire contents of both of which are incorporated herein by reference.

FIELD OF THE TECHNOLOGY

The present disclosure relates to the technical field of Internet, and in particular, to a subtitle processing method and apparatus of a multimedia file, an electronic device, a computer-readable storage medium, and a computer program product.

BACKGROUND OF THE DISCLOSURE

With the development of Internet technology, especially the development of Internet application such as network video, network music, and network education, a multimedia file (e.g., various types of video files or audio files) as an information carrier is widely used, so that information is more quickly and conveniently presented to a user. A subtitle plays an indispensable role, in addition to prompting the dialogue of characters, the subtitle may also describe, generalize, or summarize contents of video files or audio files, for example, when the user watches some foreign video files, the subtitle is needed to help the user understand contents of the video files.

However, in the solution provided by the related art, during playing a video file or an audio file, the display pattern of the subtitle is fixed. Taking the video file as an example, since different video files may be stylistically diverse, which leads to the situation that the subtitle and the video are often inconsistent at a visual perception level, and may even lead to that the subtitle may not be clearly displayed. Furthermore, manual subtitling can ensure the coordination of the subtitle and the video file, but it cannot efficiently process a large number of video files.

That is, the related art has no effective solution for how to accurately and efficiently coordinate the subtitle with the video file at the visual perception level.

SUMMARY

Embodiments of the present disclosure provide a subtitle processing method and apparatus of a multimedia file, an electronic device, a computer-readable storage medium, and a computer program product, which can accurately and efficiently coordinate a subtitle with a multimedia file at a visual perception level.

Embodiments of the present disclosure provide the subtitle processing method of a multimedia file, the method being performed by an electronic device and including:

playing the multimedia file in response to a play trigger operation, the multimedia file being associated with a plurality of subtitles, a type of the multimedia file being a video file or an audio file; and displaying the plurality of subtitles sequentially in a human-computer interaction interface during playing the multimedia file, a pattern of the plurality of subtitles being related to a content of the multimedia file.

Embodiments of the present disclosure provide the subtitle processing apparatus of a multimedia file, including: a playing module, configured to play the multimedia file in response to the play trigger operation, the multimedia file being associated with the plurality of subtitles, a type of the multimedia file being a video file or an audio file; and a display module, configured to display the plurality of subtitles sequentially in the human-computer interaction interface during playing the multimedia file, the pattern of the plurality of subtitles being related to the content of the multimedia file.

Embodiment of the present disclosure provide an electronic device, including: at least one memory, configured to store an executable instruction; and at least one processor, configured to implement the subtitle processing method of a multimedia file provided by embodiments of the present disclosure, when the executable instruction stored in the memory is performed.

Embodiments of the present disclosure provide a non-transitory computer-readable storage medium storing an executable instruction, the executable instruction when performed by the processor implementing the subtitle processing method of a multimedia file provided by embodiments of the present disclosure.

Embodiments of the present disclosure have the following beneficial effects: during playing the multimedia file, the subtitle in a pattern related to the content of the multimedia file is displayed in the human-computer interaction interface, so that a diversified display effect of multimedia file related information is realized by enriching manifestations of the subtitle, and accurately and efficiently coordinate the subtitle with the multimedia file at a visual perception level.

DESCRIPTION OF EMBODIMENTS

Figure 1:
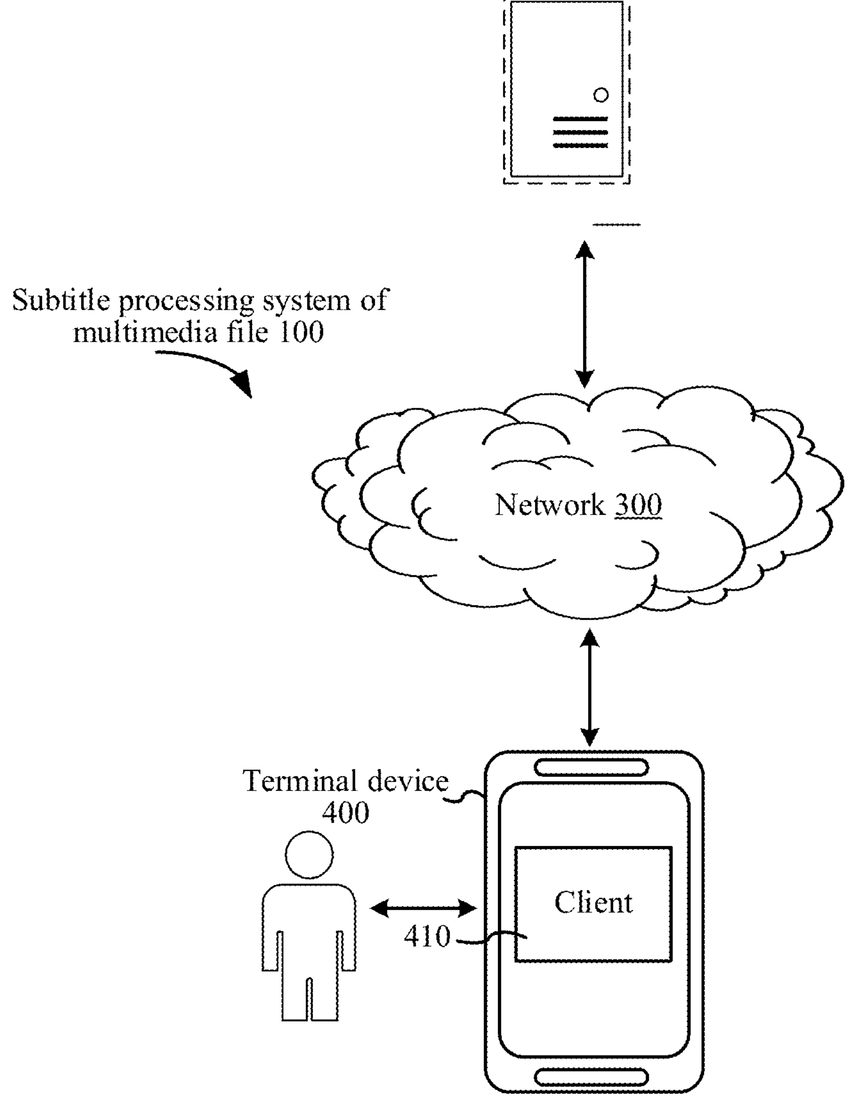
FIG. 1 is an architecture schematic diagram of a subtitle processing system of a multimedia file 100 provided by an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

Unless otherwise defined, meanings of all technical and scientific terms used in this specification are the same as those usually understood by a person skilled in the art to which the present disclosure belongs. Terms used herein are for the purpose of describing embodiments of the present disclosure only and are not intended to limit the present disclosure.

It is to be understood that, in embodiments of the present disclosure, where relevant data such as user information is related, when embodiments of the present disclosure are applied to a specific product or technology, it is necessary to obtain a user's permission or consent, and the collection, use, and processing of relevant data are needed to comply with relevant laws and regulations and standards of relevant countries and regions.

Before embodiments of the present disclosure are further described in detail, a description is made on nouns and terms related in embodiments of the present disclosure, and the nouns and terms in the embodiments of the present disclosure are applicable to the following explanations.

1) A subtitle refers to various-purpose words appearing in videos such as movies and televisions and in audio such as dramas and songs, such as copyright marks, title subtitles, casts, continuity subtitles (for introducing a content of a multimedia file, for example, displaying information related to characters or scenes appearing in the multimedia file in a textual way), lyric subtitles, and dialogue subtitles, where the dialogue subtitle is synchronized with a sounding object for displaying a voice content of the sounding object in a textual way to help a user understand contents of a video file or an audio file (for example, an audio novel).

2) A multimedia file, in terms of data form, includes a streaming media file and a local file, where the streaming media file is a multimedia file which is played using a streaming media protocol, and the streaming media protocol refers to a technology of streaming a series of multimedia data compressed and then segmented in a streaming way in a network to realize real-time transmission of audio and video over the network for playing, corresponding to a network playing scenario. A local file is a multimedia file which needs to be completely downloaded first before playing, corresponding to a local playing scenario; in terms of the content carried, video files and audio files are included.

3) A content feature includes a content feature of a static dimension and a content feature of a dynamic dimension, where the content feature of the static dimension keeps unchanged during playing the multimedia file, such as a gender and an age of an object; the content feature of the dynamic dimension may change during playing the multimedia file, such as a mood and a location of the object.

4) A pattern, also known as a subtitle pattern, a visually related property of the subtitle, and through different transformations of the same property and combinations of different properties, may form a plurality of patterns. For example, properties may include: font, color, font size, word space, boldness, tilt, underline, strikethrough, shadow offset and color, alignment, vertical margin, etc.

5) A local binary pattern (LBP) is an operator to describe a local texture feature of an image, which has the characteristics, such as rotation invariance and gray scale invariance. Its basic idea is to obtain a local image structure by comparing each pixel with its surrounding pixels. Assuming that a central pixel value is greater than an adjacent pixel value, an adjacent pixel point is assigned a value of 1, otherwise, the adjacent pixel point is assigned a value of 0, and finally a binary eight-bit representation is obtained for each pixel point, for example 11100111.

6) A wavelet (Gabor) feature is a feature obtained by transforming an image based on a Gabor function, where a Gabor transform is a windowed Fourier transform, and the Gabor function may extract relevant features in different scales and different orientations in a frequency domain for representing a texture. In a spatial domain, a two-dimensional Gabor filter is a product of a Gaussian kernel function and a sinusoidal plane wave.

7) A principal component analysis (PCA) is a statistic method that converts a group of variables with possible correlation into a group of linearly uncorrelated variables through orthogonal transformation, and the converted group of variables is called a principal component.

8) A histogram of oriented gradient (HOG) is a feature descriptor applied in the field of computer vision and image processing for object detection. This technology is used for calculating statistics of orientation information of a local image gradient. Specific implementations are as follows: firstly, the image is divided into a plurality of connected regions (also called cell units), then the gradient or edge orientation histograms of each pixel point in the cell units are collected, and finally these histograms are combined to form the feature descriptor.

9) A canonical correlation analysis (CCA) is a multivariate statistical analysis method that uses the correlation between comprehensive variables to reflect the overall correlation between two groups of indicators, and its basic principle is: in order to generally grasp the correlation between two groups of indicators, two representative comprehensive variables U1 and V1 (linear combinations of variables in two variable groups) are extracted from two groups of variables, and the correlation between the two comprehensive variables is used to reflect the overall correlation between two groups of indicators.

10) A local histogram statistic feature is a feature obtained by performing statistics on a plurality of local binary pattern features using a histogram statistics method for reflecting a pixel distribution of the image. The process of the histogram statistic method is as follows: firstly, a plurality of discrete intervals are divided, and then the number of local binary pattern features distributed over each interval is counted.

11) A local sparse reconstruction representation is to use linear combinations of a small number of local binary pattern features in a local feature library of a training set to represent the local histogram statistic feature, thereby reducing a dimension of the feature.

12) A local reconstruction residual weighting identification is a process of weighting a local sparse reconstruction representation result (i.e., a feature obtained by performing a linear combination on a small number of local binary pattern features in a local feature of a training set) through constructing a weighting matrix, and performing classification and identification on a weighted result using a residual.

Embodiments of the present disclosure provide a subtitle processing method and apparatus of a multimedia file, an electronic device, a computer-readable storage medium, and a computer program product, which can accurately and efficiently coordinate the subtitle with the multimedia file at a visual perception level. Exemplary application of the electronic device provided by embodiments of the present disclosure will be described below. The electronic device provided by embodiments of the present disclosure may be implemented as various types of terminal devices such as a notebook computer, a tablet computer, a desktop computer, a set-top box, a mobile device (e.g., a mobile phone, a portable music player, a personal digital assistant, a dedicated messaging device, a portable game device), and a vehicle-mounted terminal, or may be cooperatively implemented by a server and a terminal device. Exemplary application when the electronic device is implemented as the terminal device will be described below.

Referring to FIG. 1, FIG. 1 is an architecture schematic diagram of a subtitle processing system of a multimedia file 100 provided by an embodiment of the present disclosure. As shown in FIG. 1, a terminal device 400 is connected to a server 200 through a network 300, where the network 300 may be a wide area network or a local area network, or a combination of both.

The server 200 is a background server of a client 410 running on the terminal device 400. For example, when the client 410 is a browser, the server 200 may be a background server of a certain video website or audio website. After receiving a network request sent by the terminal device 400, the server 200 sends a requested multimedia file (such as a streaming media file) to the terminal device 400 through the network 300, where the multimedia file is associated with a plurality of subtitles.

The client 410 running on the terminal device 400 may be various types of clients, such as a video playing client, an audio playing client, the browser, and an instant communication client. When receiving a play trigger operation (for example, receiving a click operation of a user on a play button displayed in a human-computer interaction interface), the client 410 plays a multimedia file received in real-time from the server 200, and during playing the multimedia file, a plurality of subtitles are sequentially displayed in the human-computer interaction interface. A pattern of the plurality of subtitles is related to a content of the multimedia file (which will be described in detail below).

In some embodiments, the subtitle processing method of a multimedia file provided by embodiments of the present disclosure may also be implemented by the terminal device alone. For example, if a multimedia file which has been downloaded is pre-stored locally in the terminal device 400 (the multimedia file is associated with the plurality of subtitles), then a client 410 plays the multimedia file locally stored in the terminal device 400 when receiving the play trigger operation, and during playing the multimedia file, the plurality of subtitles are sequentially displayed in the human-computer interaction interface. The pattern of the plurality of subtitles is related to the content of the multimedia file.

In some other embodiments, embodiments of the present disclosure may also be implemented by means of cloud technology, which refers to a hosting technology for unifying a series of resources, such as hardware, software, and a network within the wide area network or the local area network to realize the calculation, storage, processing, and sharing of data.

Cloud technology is a general term for network technology, information technology, integration technology, management platform technology, and application technology based on cloud computing business model application, which may form a resource pool and be used as needed with flexibility and convenience. Cloud computing technology will become an important support. Background services of a technical network system require a large number of computing and storage resources.

Illustratively, the server 200 shown in FIG. 1 may be an independent physical server, may be a server cluster or distributed system composed of a plurality of physical servers, and may also be a cloud server providing basic cloud computing services such as a cloud service, a cloud database, cloud computing, a cloud function, a cloud storage, a network service, a cloud communication, a middleware service, a domain name service, a security service, a content delivery network (CDN), and a big data and artificial intelligence platform. The terminal device 400 may be a smartphone, a tablet computer, a notebook computer, a desktop computer, a smart speaker, a smartwatch, or the like, but is not limited thereto. The terminal device 400 and the server 200 may be directly or indirectly connected by wired or wireless communication, and are not limited in embodiments of the present disclosure.

In some embodiments, the terminal device 400 may also implement the subtitle processing method of a multimedia file provided by embodiments of the present disclosure through running a computer program. For example, the computer program may be a native program or a software module in an operating system, may be a native application (APP), i.e., a program (i.e., the above-mentioned client 410) which needs to be installed in the operating system to run, such as the video playing client, the audio playing client, and the browser, may also be a mini program, i.e., a program which may be run by simply downloading it into a browser environment, and may also be a mini program that may be embedded into any APP. In general, the above-mentioned computer program may be any form of application, module, or plug-in.

Figure 2:
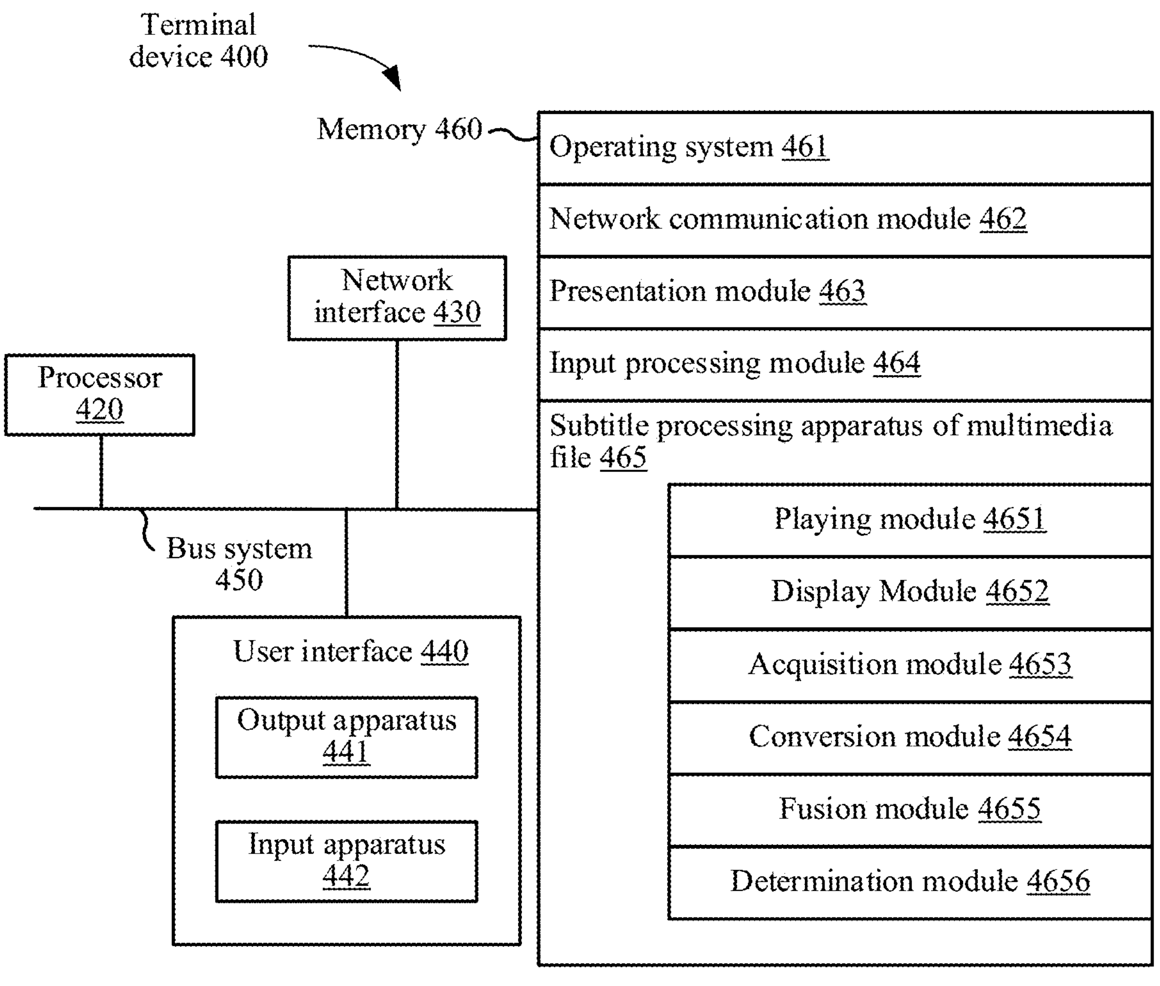
FIG. 2 is a schematic structural diagram of a terminal device 400 provided by an embodiment of the present disclosure.

A structure of the terminal device 400 illustrated in FIG. 1 continues to be described below. Referring to FIG. 2, FIG. 2 is a schematic structural diagram of a terminal device 400 provided by an embodiment of the present disclosure. The terminal device 400 shown in FIG. 2 includes: at least one processor 420, a memory 460, at least one network interface 430, and a user interface 440. The various components in the terminal device 400 are coupled together by a bus system 450. It may be understood that, the bus system 450 is configured to implement connection and communication between the components. In addition to a data bus, the bus system 450 further includes a power bus, a control bus, and a state signal bus. But, for ease of clear description, all types of buses in FIG. 2 are marked as the bus system 450.

The processor 420 may be an integrated circuit chip having signal processing capabilities such as a general purpose processor, a digital signal processor (DSP), or other programmable logic devices, a discrete gate, or a transistor logic device, a discrete hardware component, where the general purpose processor may be a microprocessor or any processor, etc.

The memory 460 includes either a volatile memory or a non-volatile memory, and may include both the volatile memory and the non-volatile memory. The non-volatile memory may be a read only memory (ROM), and the volatile memory may be a random access memory (RAM). The memory 460 described in embodiments of the present disclosure is intended to include any suitable type of memory. The memory 460 may include one or more storage devices physically located away from the processor 420.

In some embodiments, the memory 460 can store data to support various operations, and examples of these data include programs, modules, and data structures or subsets or supersets thereof, as exemplified below.

An operating system 461 includes system programs for processing various basic system services and performing hardware-related tasks, such as a framework layer, a core library layer, and a driver layer, for implementing various basic services and processing hardware-based tasks.

A network communication module 462 is configured to reach other computing devices via one or more (wired or wireless) network interfaces 430. An exemplary network interface 430 includes: Bluetooth, WiFi, and a universal serial bus (USB), etc.

A presentation module 463 is configured to present information (such as a user interface configured to operate a peripheral device and display the content and information) via one or more output apparatus 441 associated with the user interface 440 (such as a display screen and a speaker).

An input processing module 464 is configured to detect one or more user inputs or interactions from one of the one or more input apparatus 442 and translate detected inputs or interactions.

In some embodiments, the subtitle processing apparatus of a multimedia file provided by embodiments of the present disclosure may be implemented in software. The subtitle processing apparatus of a multimedia file provided by embodiments of the present disclosure may be provided as various software embodiments including application, software, a software module, a script, or a code.

FIG. 2 illustrates a subtitle processing apparatus of a multimedia file 465 stored in the memory 460, which may be software in the form of the program and the plug-in, etc., and includes a series of modules, including a playing module 4651, a display module 4652, an acquisition module 4653, a conversion module 4654, a fusion module 4655, and a determination module 4656, which are logical, and thus may be arbitrarily combined or further split according to functions implemented. All of the above-mentioned modules are illustrated at once in FIG. 2 for ease of expression, but it is not to be considered as excluding an implementation in the subtitle processing apparatus of a multimedia file 465, which may include only the playing module 4651 and the display module 4652, and functions of each module will be described below.

Figure 3:
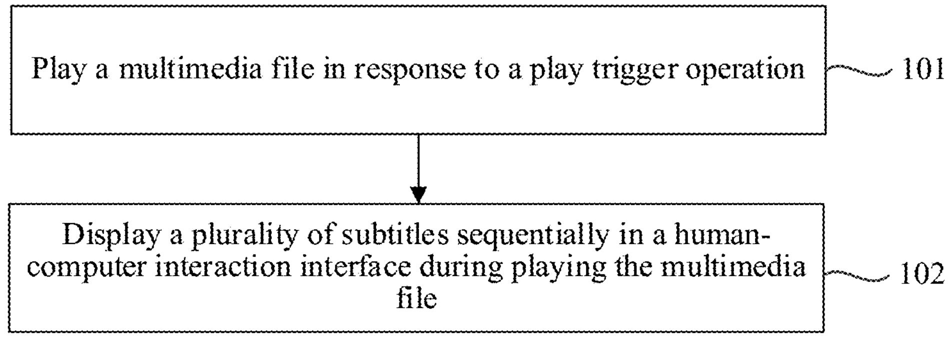
FIG. 3 is a flowchart of a subtitle processing method of a multimedia file provided by an embodiment of the present disclosure.

As described above, the subtitle processing method of a multimedia file provided by embodiments of the present disclosure may be implemented by various types of electronic devices. Referring to FIG. 3, FIG. 3 is a flowchart of a subtitle processing method of a multimedia file provided by an embodiment of the present disclosure, which will be described in conjunction with the steps illustrated in FIG. 3.

It should be noted that the method illustrated in FIG. 3 may be performed by various forms of the computer program run by the terminal device 400, and is not limited to the above-mentioned client 410 run by the terminal device 400, and may also be, such as the above-mentioned operating system 461, software module, script, and mini program, and therefore an example of the client in the following should not be considered as a limitation of embodiments of the present disclosure.

In step 101, the multimedia file is played in response to the play trigger operation.

Here, the multimedia file is associated with the plurality of subtitles, and each subtitle corresponds to a playing period on a playing time axis of the multimedia file. A bar is a basic unit for displaying the subtitle and may be one or more lines of text, including multilingual texts such as character languages, plots, and introductions of characters. Each subtitle is provided with a corresponding display period, including a start display time and an end display time. For example, for one subtitle A, a corresponding display period may be 10:00 to 10:05, in other words, a corresponding subtitle may be displayed according to a playing period of a real-time playing progress of the multimedia file, and the subtitle applies patterns adapted to content features of at least one dimension of the multimedia file, i.e., for subtitles associated with different multimedia files, corresponding display styles are different, which can accurately and efficiently coordinate the subtitle with the multimedia file at the visual perception level.

Furthermore, a data form of the multimedia file may include the streaming media file (corresponding to the network playing scenario, for example, in response to the play trigger operation, the client requests the streaming media file from the server in real-time and plays it) and the local file (corresponding to the local playing scenario, for example, in response to the play trigger operation, the client plays the multimedia file locally pre-stored in the terminal device), and types of the multimedia file (i.e., the content carried) may include the video file and the audio file.

Illustratively, taking the multimedia file as the video file as an example, it is assumed that a subtitle "how do you know" corresponds to the playing period of 10:00 to 10:05 on the playing time axis of the video file, i.e., during playing 10:00 to 10:05 of the video file, the subtitle "how do you know" is displayed, and the subtitle "how do you know" is applied with a corresponding pattern, for example, a pattern adapted to properties (such as age, gender, and mood) of a sounding object in an object segment with the playing period of 10:00 to 10:05 is applied.

In some embodiments, a format of a subtitle file may include a picture format and a text format. A subtitle file in the picture format is composed of an idx and a sub file, where the idx is equivalent to an index file, and includes a time code (i.e., the above-mentioned playing period) when the subtitle appears and the property (i.e., the above-mentioned pattern) displayed by the subtitle; and the sub file is subtitle data, and an occupied space is large because it is in the picture format, so compression may be performed to save space. An extension of the subtitle file in the text format is generally ass, srt, sml, ssa, or sub (the same as a suffix of the above-mentioned subtitle in the picture format, but data formats are different), and an occupied space is small because it is in the text format.

It should be noted that for a subtitle in the text format, patterns of the subtitle, including an original pattern and a new pattern (i.e., the pattern adapted to the content feature of at least one dimension of the multimedia file), may be recorded in a file such as ass, srt, sml, ssa, or sub.

In step 102, the plurality of subtitles is displayed sequentially in the human-computer interaction interface during playing the multimedia file.

Here, the pattern of the plurality of subtitles (i.e., the plurality of subtitles associated with the multimedia file, e.g., through reading from the above-mentioned subtitle file) is related to the content of the multimedia file.

In some embodiments, the patterns of the plurality of subtitles may be the same (i.e., the subtitle patterns keep unchanged during playing the whole multimedia file), and then the above-mentioned displaying the plurality of subtitles sequentially in the human-computer interaction interface may be implemented through the following way. A plurality of subtitles applying the same pattern is displayed sequentially in the human-computer interaction interface. The same pattern of the subtitle is adapted to the content feature of at least one dimension of the multimedia file.

Illustratively, taking the multimedia file as the video file as an example, during playing the video file, the plurality of subtitles applying the pattern (for example, when the pattern of the video file is a comedy, a corresponding pattern may be an STCaiyun, 4, and blue) adapted to the content feature of at least one dimension of the video file (for example, the pattern of the video file) are sequentially displayed in the human-computer interaction interface, i.e., during the playing of the whole video file, the subtitles are all displayed in the pattern with a font being the STCaiyun, a font size being 4, and a color being blue, in other words, when the pattern of the video file is the comedy, a style of the corresponding subtitle pattern is also cartoon-like and funny, and has a high degree of conformity with the content of the video file so as to accurately and efficiently coordinate the subtitle with the video file at the visual perception level.

It should be noted that the subtitle may be displayed at a fixed position of the human-computer interaction interface (for example, displaying the subtitle at the middle and lower parts of the human-computer interaction interface), and of course, a position displaying the subtitle may also be dynamically changed. For example, for the video file, the subtitle may be displayed in the human-computer interaction interface avoiding a position of an object appearing in the video picture, and the subtitle may also be displayed in a mode of being superimposed on the video picture. Embodiments of the present disclosure do not specifically limit the position displaying the subtitle.

In some other embodiments, the patterns of the plurality of subtitles may also be different, i.e., the subtitle patterns may change during playing the whole multimedia file. For example, the plurality of subtitles apply the patterns adapted to the content feature of at least one dimension of the segment to which the plurality of subtitles belong, and then the above-mentioned displaying the plurality of subtitles sequentially in the human-computer interaction interface may be implemented by the following way. The multimedia file is divided to obtain a plurality of segments, where types of the segment may include at least one of the following: an object segment, a scenario segment, and a plot segment. The following processing is performed during playing each segment of the multimedia file. At least one subtitle associated with the segment is displayed sequentially in the human-computer interaction interface based on the pattern adapted to the content feature of at least one dimension of the segment. In this way, by dividing the multimedia file and displaying a subtitle in a pattern related to the content of each segment obtained after dividing the multimedia file, the coordination of the subtitle and the multimedia file at the visual perception level may be further improved.

Illustratively, the multimedia file may be divided into a plurality of object segments according to objects (such as characters, animals) appearing in the multimedia file. Each object segment includes one object (for example, an object included in an object segment A is an object A, and an object included in an object segment B is an object B, where the object A and the object B are two different objects, and object properties of the two are different, for example, the object A is a male, and the object B is a female; or the object A is a young person, and the object B is an elderly person), and then the following processing is performed during playing each of the object segments of the multimedia file. Based on a pattern adapted to a content feature of at least one dimension of the object segment (for example, the object segment A), for example, a pattern adapted to an object property of the object A included in the object segment A (for example, assuming that the object A is identified as the male), assuming that a pattern adapted to the male is bold and 5, i.e., a style of the subtitle pattern is slightly masculine, at least one subtitle associated with the object segment A is displayed sequentially in the human-computer interaction interface, i.e., the at least one subtitle associated with the object segment A may be displayed in the pattern with the font being bold and the font size being 5.

Illustratively, the multimedia file may be divided into a plurality of scenario segments according to different scenarios (for example, for various types of history or geographical documentaries, a documentary may be divided into a plurality of different scenario segments according to scenarios). Each scenario segment includes one scenario, and scenarios included in different scenario segments may be different, for example, a scenario included in a scenario segment A is a campus, and a scenario included in a scenario segment B is a park, and then the following processing is performed during playing each scenario segment of the multimedia file. Based on a pattern adapted to a content feature of at least one dimension of the scenario segment (for example, the scenario segment B), for example, a pattern adapted to the scenario included in the scenario segment B, assuming that the scenario included in the scenario segment B is a seaside, a pattern adapted to the seaside may be regular script and blue, i.e., the style of the subtitle pattern is adapted to the seaside, and at least one subtitle associated with the scenario segment B is displayed sequentially in the human-computer interaction interface, i.e., the at least one subtitle associated with the scenario segment B may be displayed in the pattern with the font being regular script and the color being blue.

Illustratively, the multimedia file may be divided into a plurality of plot segments according to the content of the multimedia file, for example, for the video file, it may be divided into a plurality of plot segments, such as the occurrence, development, climax, and ending of a plot. Each plot segment corresponds to one plot, and plots corresponding to different plot segments may be different, for example, a plot segment A corresponds to a development stage of the plot, and a plot segment B corresponds to a climax stage of the plot, and then the following processing is performed during playing each plot segment of the multimedia file. Based on a pattern adapted to a content feature of at least one dimension of the plot segment (for example, a plot segment C), for example, assuming that the plot segment C is a climax segment, a pattern adapted to the climax segment may be Chinese amber and 3. The font size is large and the font style is serious, adapting to the climax segment. At least one subtitle associated with the plot segment C is displayed sequentially in the human-computer interaction interface, i.e., the at least one subtitle associated with the plot segment C may be displayed in the pattern with the font being Chinese amber and the font size being 3.

It should be noted that the above-mentioned process of dividing the multimedia file is merely a logical identification and division of the multimedia file, and the data form of the multimedia file does not change, i.e., the multimedia file does not need to be divided, but merely adds a corresponding mark on the playing time axis of the multimedia file so as to logically divide the multimedia file into different segments. Of course, the multimedia file may also be divided, and embodiments of the present disclosure do not specifically limit this.

Furthermore, in addition to performing a single type of division, i.e., identifying a plurality of segments of one type, for example, the multimedia file may be divided into a plurality of object segments merely according to objects appearing in the multimedia file. A composite type of division may also be performed, i.e., a plurality of segments of different types are identified. For example, the multimedia file may be divided according to the objects and scenarios appearing in the multimedia file at the same time. In this way, a plurality of segments obtained by division may include the object segment and the scenario segment at the same time, and then the object segment and the scenario segment obtained by division are combined and de-duplicated. For example, when the object segment A (assuming that the corresponding period is 10:00 to 12:00) and the scenario segment B (assuming that the corresponding period is also 10:00 to 12:00) coincide, only one is retained. Thus, a final division result is obtained, and embodiments of the present disclosure do not specifically limit the division way.

In some other embodiments, patterns of at least one subtitle associated with the same segment may be the same, i.e., during playing the same segment, the subtitle pattern will not change, and then the above-mentioned at least one subtitle associated with the segment being displayed sequentially in the human-computer interaction interface based on the pattern adapted to the content feature of at least one dimension of the segment may be implemented by the following way. A content feature of a static dimension of the segment is acquired, and at least one subtitle associated with the segment in the human-computer interaction interface is synchronously displayed. The pattern of the subtitle keeps unchanged during playing the segment, so that computing resources and communication resources of the terminal device may be saved on the basis of accurately and efficiently coordinating the subtitle with the multimedia file at a visual perception level.

Illustratively, taking the type of the segment as the object segment as an example, a content feature of a static dimension of the object segment may include at least one of the following object properties of a sounding object in the object segment: a role type (including a positive role and a negative role), a gender and an age. For example, for the object segment A, object properties (for example, the gender of the object A, assuming that the gender of the object A is identified as the female) of a sounding object (for example, the object A) in the object segment A are firstly acquired, and then at least one subtitle associated with the object segment A is synchronously displayed in the human-computer interaction interface. The pattern of the subtitle is adapted to the female, for example, the pattern may be YouYuan and pink, i.e., the style of the subtitle is slightly feminine, and keeps unchanged during playing the object segment A, i.e., during playing the object segment A, the subtitle is always displayed in the pattern with the font being YouYuan and the color being pink.

Figures 4A, 4B, 4C:
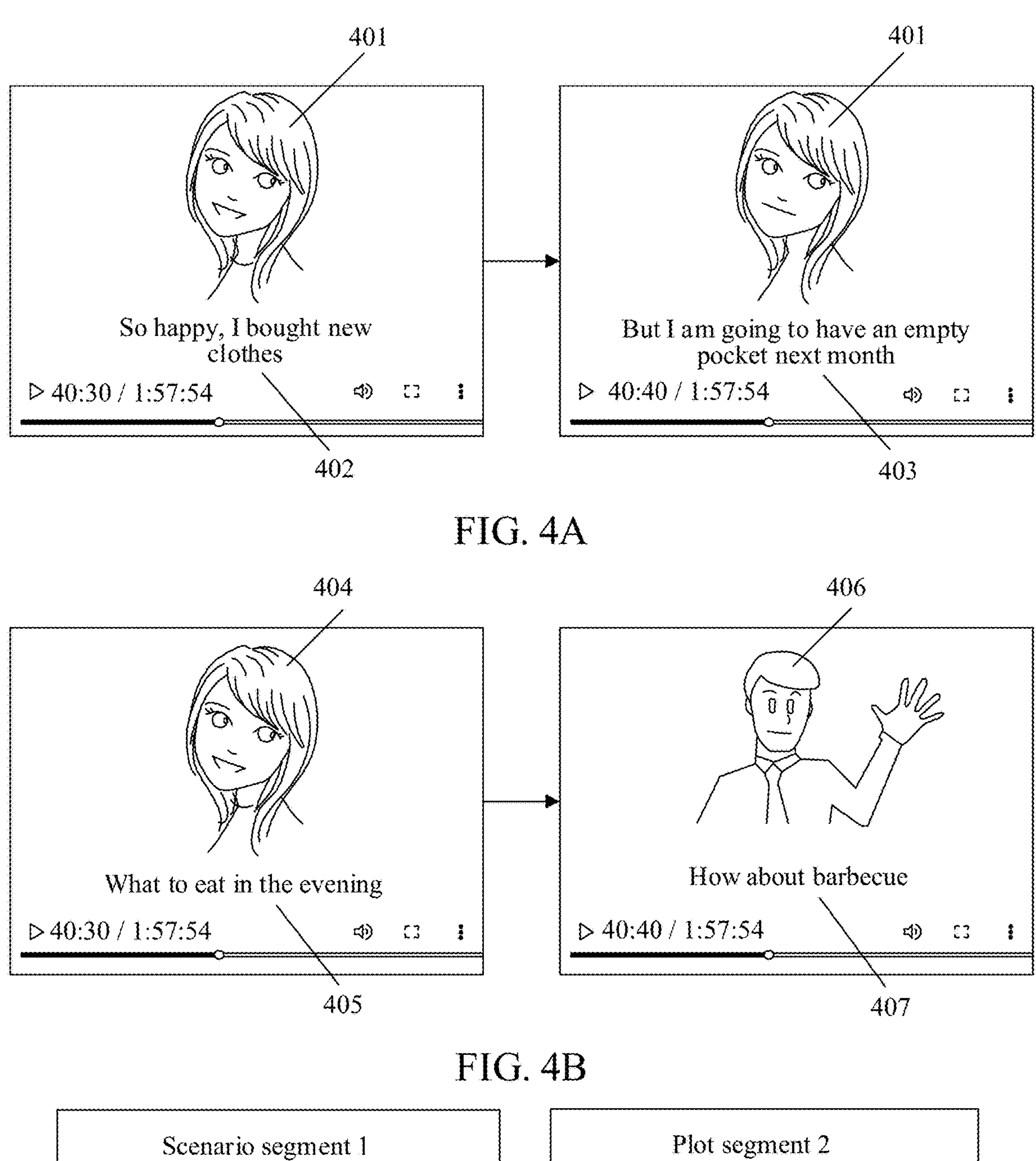
FIG. 4A is a schematic diagram of an application scenario of a subtitle processing method of a multimedia file provided by an embodiment of the present disclosure.
FIG. 4B is a schematic diagram of an application scenario of a subtitle processing method of a multimedia file provided by an embodiment of the present disclosure.
FIG. 4C is a schematic diagram of a division principle of a segment provided by an embodiment of the present disclosure.

For example, taking the multimedia file as the video file as an example, and referring to FIG. 4A, FIG. 4A is a schematic diagram of an application scenario of a subtitle processing method of a multimedia file provided by an embodiment of the present disclosure. As shown in FIG. 4A, for a certain object segment (a corresponding playing period being 40:30 to 40:40), when the gender of a sounding object 401 in the object segment is identified as the female, at least one subtitle associated with the object segment is synchronously displayed in the human-computer interaction interface. For example, a subtitle 402 is displayed at 40:30 ("So happy, I bought new clothes"), and a subtitle 403 is displayed at 40:40 ("But I am going to have an empty pocket next month"). And the subtitle 402 and the subtitle 403 are applied with patterns adapted to the female, for example, a font style of the subtitle 402 and the subtitle 403 is cute, and the patterns keep unchanged during playing the object segment, i.e., patterns of the subtitle 402 and the subtitle 403 are the same.

It should be noted that for the plot segment, a content feature of a static dimension of the plot segment may include a plot progress of the plot segment, and for the same plot segment, during playing the plot segment, patterns of all subtitles associated with the plot segment may be the same, for example, patterns adapted to the plot progress are applied to all subtitles associated with the plot segment. And for the scenario segment, a content feature of a static dimension of the scenario segment may include a scenario type of the scenario segment, and for the same scenario segment, during playing the scenario segment, patterns of all subtitles associated with the scenario segment may be the same, for example, patterns adapted to the scenario type are applied to all subtitles associated with the scenario segment.

Furthermore, patterns of subtitles associated with different segments may be different, for example, taking the object segment as an example, referring to FIG. 4B, FIG. 4B is a schematic diagram of an application scenario of a subtitle processing method of a multimedia file provided by an embodiment of the present disclosure. As shown in FIG. 4B, a sounding object 404 and a sounding object 406 belong to sounding objects included in different object segments, and a subtitle 405 ("What to eat in the evening") associated with an object segment where the sounding object 404 is located and a subtitle 407 ("How about barbecue") associated with an object segment where the sounding object 406 is located have different patterns. For example, the font of the subtitle 405 is FZShuti, and the font of the subtitle 407 is STCaiyun, thus, different patterns are applied to the subtitles corresponding to different sounding objects. For example, the pattern of the subtitle 405 is FZShuti adapted to the female (the font style is soft), and the pattern of the subtitle 407 is STCaiyun adapted to the male (the font style is masculine) so as to facilitate the user in distinguishing different objects appearing in the video file.

In some embodiments, after the multimedia file is divided to obtain a plurality of segments, any one or more segments in the plurality of segments may also be divided again to obtain a plurality of sub-segments, in this way, by performing a more refined division on the multimedia file, it can be ensured that the subtitle is related to the content of the multimedia file in real-time during propagating of the multimedia file, thereby further improving the coordination between the subtitle and the multimedia file at the visual perception level.

Illustratively, referring to FIG. 4C, FIG. 4C is a schematic diagram of a division principle of a segment provided by an embodiment of the present disclosure. As shown in FIG. 4C, taking a scenario segment 1 and a plot segment 2 (the scenario segment 1 and the plot segment 2 may be two adjacent segments, i.e., after playing the scenario segment 1, continuing to play the plot segment 2) in a plurality of segments obtained by dividing the multimedia file as an example, for the scenario segment 1, the scenario segment 1 may be further divided into three different character sub-segments according to the characters appearing in the scenario segment 1, for example, a character sub-segment 1, a character sub-segment 2, and a character sub-segment 3 are included. Characters included in different character sub-segments may be different, for example, the character sub-segment 1 includes a character A, the character sub-segment 2 includes a character B, and the character sub-segment 3 includes a character C. For the plot segment 2, the plot segment 2 may also be further divided into two different scenario sub-segments according to the scenarios appearing in the plot segment 2, for example, a scenario sub-segment 1 and a scenario sub-segment 2 are included. Scenarios included in different scenario sub-segments may be different, for example, a scenario of the scenario sub-segment 1 is a campus, and a scenario of the scenario sub-segment 2 is a park. Taking the scenario segment 1 as an example, after three character sub-segments are obtained by dividing, for each character sub-segment, at least one subtitle associated with the character sub-segment may be displayed based on a pattern adapted to a content feature of at least one dimension of the sub-segment during playing the character sub-segment, which will be described in detail below.

In some embodiments, when patterns of a plurality of subtitles associated with the same segment are different, the above-mentioned at least one subtitle associated with the segment being displayed sequentially in the human-computer interaction interface based on the pattern adapted to the content feature of at least one dimension of the segment may be implemented by the following way. The segment is divided to obtain a plurality of sub-segments. The plurality of sub-segments have the content feature of the static dimension of the segment (the content feature of the static dimension keeps unchanged during playing the segment) and a content feature of a dynamic dimension of the segment (content features of different dynamic dimensions will change during playing the segment), and content features of the dynamic dimensions of different sub-segments are different. The following processing is performed during playing each sub-segment of the segment. At least one subtitle associated with the sub-segment is displayed based on a pattern adapted to the content feature of the static dimension and the content feature of the dynamic dimension that the sub-segment has.

Illustratively, for the object segment, the content feature of the static dimension of the object segment may include at least one of the following object properties: a role type, a gender, and an age of the sounding object in the object segment. The content feature of the dynamic dimension of the object segment may include the following object properties: a mood of the sounding object in the object segment. For example, taking the multimedia file as the video file as an example, for a certain object segment (for example, the object segment A) in the video file, firstly, the object segment A is divided into a plurality of sub-segments, and then the following processing is performed during playing each sub-segment of the object segment A. At least one subtitle associated with the sub-segment is displayed based on the pattern adapted to the content feature of the static dimension (for example, a gender of a sounding object in the object segment A) and the content feature of the dynamic dimension (for example, a mood of a sounding object in the current sub-segment) that the sub-segment has, i.e., a pattern of at least one subtitle associated with the sub-segment is adapted to the gender of the sounding object and the mood of the sounding object in the current sub-segment.

Figures 4D, 4E, 4F:
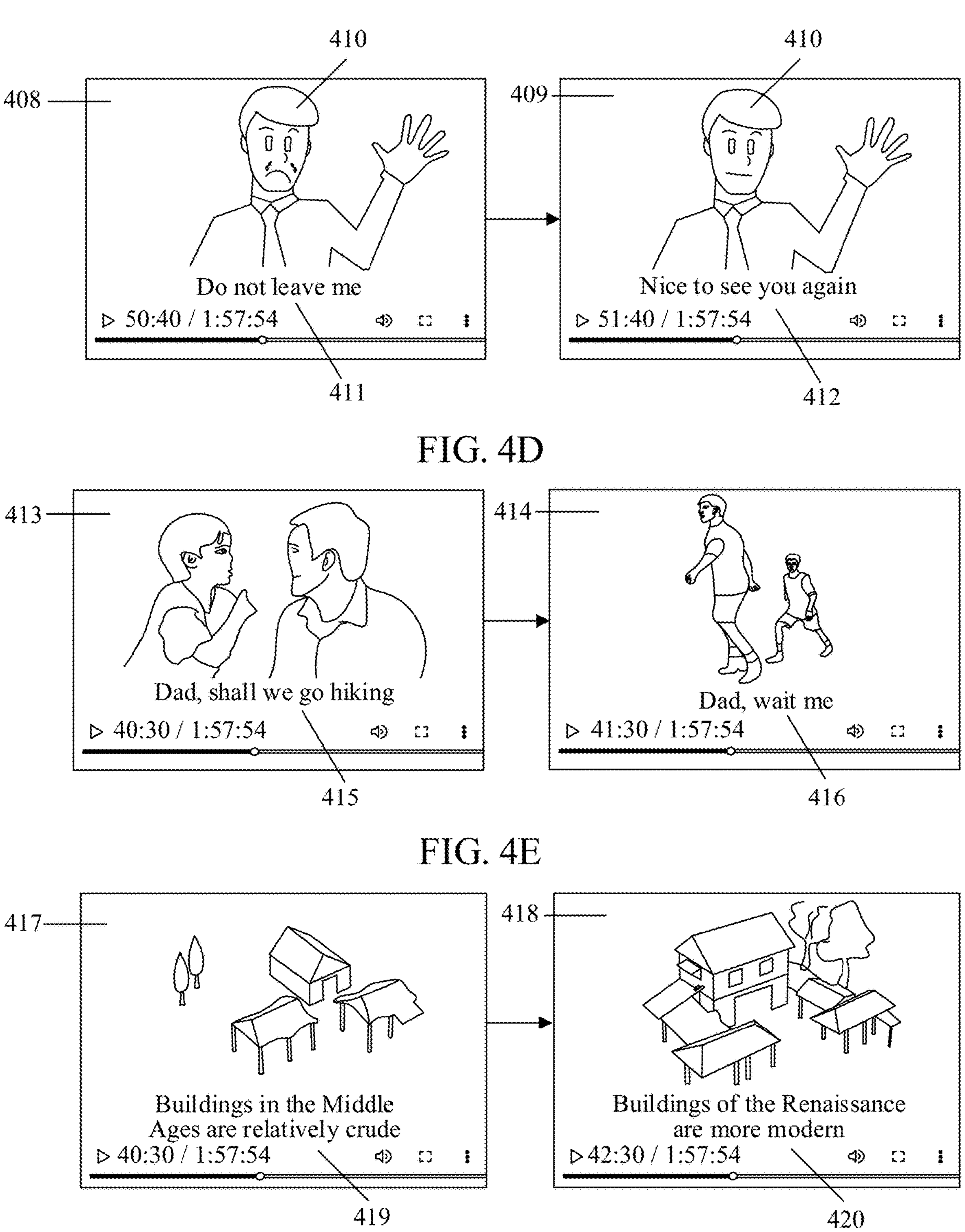
FIG. 4D to FIG. 4F are schematic diagrams of application scenarios of a subtitle processing method of a multimedia file provided by an embodiment of the present disclosure.

For example, taking the multimedia file as the video file as an example, referring to FIG. 4D, FIG. 4D is a schematic diagram of an application scenario of the subtitle processing method of a multimedia file provided by an embodiment of the present disclosure. As shown in FIG. 4D, a sub-segment 408 and a sub-segment 409 are different sub-segments belonging to the same object segment. In the sub-segment 408, an expression of a sounding object 410 is sad, while in the sub-segment 409, the expression of the sounding object 410 changes from sad to happy. Correspondingly, a pattern of a subtitle 411 ("Do not leave me") associated with the sub-segment 408 is different from a pattern of a subtitle 412 ("Nice to see you again") associated with the sub-segment 409. For example, the subtitle 411 has a font of STLiti and a font size of small four. The font size is small, and the font style is serious, adapting to a sad mood. However, the subtitle 412 has a font of STCaiyun and a font size of four. The font size is large, and the font style is festive, adapting to a happy mood. Thus, for the same object segment, the subtitle pattern will be adjusted correspondingly with a mood change of the sounding object so as to accurately and efficiently coordinate the subtitle with the video file at the visual perception level.

Illustratively, for the plot segment, the content feature of the static dimension of the plot segment may include a plot type of the plot segment, and a content feature of a dynamic dimension of the plot segment may include at least one of the following: scenario types of different scenarios appearing in the plot segment, and object properties of different sounding objects appearing in the plot segment. For example, taking the multimedia file as the video file as an example, for a certain plot segment (for example, the plot segment B) in the video file, firstly, the plot segment B is divided into a plurality of sub-segments, and then the following processing is performed during playing each sub-segment of the plot segment B. At least one subtitle associated with the sub-segment is displayed based on the pattern adapted to the content feature of the static dimension (for example, a plot type of the plot segment B) and the content feature of the dynamic dimension (for example, a scenario type appearing in the current sub-segment) that the sub-clip has, i.e., the pattern of at least one subtitle associated with the sub-segment is adapted to the plot type of the plot segment B and the scenario type appearing in the current sub-segment.

For example, taking the multimedia file as the video file as an example, referring to FIG. 4E, FIG. 4E is a schematic diagram of an application scenario of the subtitle processing method of a multimedia file provided by an embodiment of the present disclosure. As shown in FIG. 4E, a sub-segment 413 and a sub-segment 414 are different sub-segments belonging to the same plot segment. In the sub-segment 413, a scenario appearing is home, while in the sub-segment 414, a scenario appearing is switched from home to outdoors. Correspondingly, a pattern of a subtitle 415 ("Dad, shall we go hiking") associated with the sub-segment 413 is different from a pattern of a subtitle 416 ("Dad, wait me") associated with the sub-segment 414. For example, a font of the subtitle 415 is bold, and a font of the subtitle 416 is Chinese amber. Thus, for different sub-segments of the same plot segment, the subtitle pattern will be adjusted correspondingly with a change of the content features of the dynamic dimensions of the different sub-segments, so that the user can more easily understand the video content according to a change of the subtitle pattern.

Illustratively, for the scenario segment, the content feature of the static dimension of the scenario segment may include: a scenario type related to the scenario segment. A content feature of a dynamic dimension of the scenario segment may include at least one of the following: object properties of different sounding objects appearing in the scenario segment, and types of different plots appearing in the scenario segment. For example, taking the multimedia file as the video file as an example, for a certain scenario segment (for example, a scenario segment C) in the video file, firstly, the scenario segment C is divided into a plurality of sub-segments, and then the following processing is performed during playing each sub-segment of the scenario segment C. At least one subtitle associated with the sub-segment is displayed based on the pattern adapted to the content feature of the static dimension (for example, a scenario type related to the scenario segment C) and the content feature of the dynamic dimension (for example, a type of a plot appearing in the current sub-segment) that the sub-segment has, i.e., the pattern of at least one subtitle associated with the sub-segment is adapted to the scenario type related to the scenario segment C and the type of the plot appearing in the current sub-segment.

For example, taking the multimedia file as the video file as an example, referring to FIG. 4F, FIG. 4F is a schematic diagram of an application scenario of the subtitle processing method of a multimedia file provided by an embodiment of the present disclosure. As shown in FIG. 4F, a sub-segment 417 and a sub-segment 418 are different sub-segments belonging to the same scenario segment. A type of a plot occurring in the sub-segment 417 is a development stage, while a type of a plot occurring in the sub-segment 418 enters a climax stage from the development stage. Accordingly, a pattern of a subtitle 419 ("Buildings in the Middle Ages are relatively crude") associated with the sub-segment 417 is different from a pattern of a subtitle 420 ("Buildings of the Renaissance are more modern") associated with the sub-segment 418. For example, a font of the subtitle 419 is STXingkai, and a font of the subtitle 420 is YouYuan. Thus, for different sub-segments of the same scenario segment, the subtitle pattern will be adjusted correspondingly with the change of the content features of the dynamic dimensions of the different sub-segments, so that the user can more easily understand the video content according to the change of the subtitle pattern.

A conversion process of the subtitle pattern is described below.

In some embodiments, for the case where the patterns of the plurality of subtitles associated with the multimedia file are the same (i.e., the subtitle patterns keep unchanged during playing the whole multimedia file), step 103A and step 104A shown in FIG. 5A may be performed before performing step 102 shown in FIG. 3, which will be described in conjunction with the steps shown in FIG. 5A.

In step 103A, the content feature of the at least one dimension of the multimedia file is acquired.

Here, the content feature of at least one dimension of the multimedia file may include: the style (for example, for the video file, types of corresponding styles may include comedy, horror, suspense, cartoon, etc.; for the audio file, types of corresponding styles may include pop, rock, etc.), the object (such as characters, animals, etc. appearing in the multimedia file), the scenario, the plot, and a hue.

In some embodiments, the above-mentioned step 103A may be implemented by the following way. A content feature identification model is called to perform a content feature identification on the content of the multimedia file to obtain the content feature of at least one dimension of the multimedia file. The content feature identification model is obtained by training based on a sample multimedia file and a label labeled for a content of the sample multimedia file.

Illustratively, the content feature identification model may be an individual style identification model, a scenario identification model, a plot identification model, and a hue identification model, and may also be a combination model (for example, a model capable of identifying the style and the scenario of the multimedia file at the same time). The content feature identification model may be a neural network model (such as a convolutional neural network, a depth convolution neural network, or a fully connected neural network), a decision tree model, a gradient boosting tree, a multilayer perception, and a support vector machine, etc. Embodiments of the present disclosure do not specifically limit a type of the content feature identification model.

In some other embodiments, when the multimedia file is the video file, the above-mentioned step 103A may be implemented by the following way. The following processing is performed for the target object appearing in the video file. Firstly, a target video frame where a target object is located is preprocessed, for example, the target video frame may be clipped to clip the target video frame to a set size, or the target object in the target video frame is rotated to enable the target object to be in a horizontal state so as to facilitate subsequent processing. Furthermore, when a plurality of target video frames are acquired, the clarity of the target object included in each target video frame may be determined (for example, the clarity may be determined by a Sobel operator, a more blurred image has a more unclear edge, and therefore a value of the Sobel operator thereof is also greater. The Sobel operator is composed of two 3×3 convolution kernels, which are used for calculating a gray scale weighted difference of a central pixel neighborhood), and a target video frame with the highest definition is selected to perform subsequent processing. Then a feature extraction is performed on a target video frame being preprocessed to obtain an image feature corresponding to the target video frame, for example, a wavelet (Gabor) feature for describing image texture information in the target video frame may be extracted as the image feature corresponding to the target video frame. Later a dimension reduction is performed on the image feature, for example, a principal component feature component of the image feature may be extracted using the principal component analysis to realize the dimension reduction of the image feature (for example, a matrix $XX^T$ may be obtained by firstly calculating an image feature X of the target video frame, then a feature value decomposition on the matrix $XX^T$ is performed, and feature vectors corresponding to the maximum L feature values are retained. A decoding matrix D is formed according to columns, then a transpose of the decoding matrix D is taken to obtain an encoding matrix. The image feature X is compressed, and finally, the L principal component feature components of the image are reconstructed using the decoding matrix D, where $X^T$ represents the transpose of the image feature X, and L is a positive integer greater than or equal to 1). Finally, the image features after the dimension reduction are classified by a trained classifier to obtain an object property of the target object, for example, a gender of the target object.

In some embodiments, when the multimedia file is the video file, the above-mentioned step 103A may also be implemented by the following way. The following processing is performed for the target object appearing in the video file. Firstly, a local binary pattern feature corresponding to the target video frame where the target object is located is extracted, and a dimension reduction is performed on the local binary pattern feature, for example, the dimension reduction may be performed on the local binary pattern feature using the principal component analysis. Then a histogram of oriented gradient feature corresponding to the target video frame is extracted, and a dimension reduction is performed on the histogram of oriented gradient feature, for example, the dimension reduction may be performed on the histogram of oriented gradient feature using the principal component analysis. Later the canonical correlation analysis is performed on the local binary pattern feature and the histogram of oriented gradient image after the dimension reduction (i.e., two representative comprehensive variables are extracted from two groups of variables, and the correlation between the two comprehensive variables is used to reflect the overall correlation between two groups of indicators) to obtain an analysis result, for example, the correlation between the local binary pattern feature and the histogram of oriented gradient feature may be mined by calculating a canonical correlation coefficient (a quantitative indicator for measuring the degree of linear correlation between two random vectors) between the local binary pattern feature and the histogram of oriented gradient feature. Finally, a regression is performed on the analysis result (including a linear regression and a non-linear regression, where the linear regression is a technology for modeling the relationship between a single input variable and an output variable using a linear model, and the non-linear regression is a technology for modeling the relationship between a plurality of independent input variables and output variables) to obtain the object property of the target object. For example, taking the object property as the age as an example, probabilities that the analysis result is mapped to different ages may be calculated by the linear model, and an age corresponding to the maximum probability is determined as the age of the target object.

In some other embodiments, when the multimedia file is the video file, the above-mentioned step 103A may also be implemented by the following way. The following processing is performed for the target object appearing in the video file. Firstly, the target video frame where the target object is located is normalized (i.e., an average gray scale and a contrast of different target video frames are adjusted to a fixed level so as to provide a relatively uniform image specification for subsequent processing), and the target video frame being normalized is partitioned to obtain a plurality of sub-regions, for example, the target video frame may be divided into a plurality of rectangles, and each rectangle represents a sub-region; Then a local binary pattern feature corresponding to each of the sub-regions is extracted, and statistics are performed on a plurality of local binary pattern features, for example, statistics are performed on the plurality of local binary pattern features using a histogram statistic method to obtain a local histogram statistic feature corresponding to the target video frame. Later the local sparse reconstruction representation is performed on the local histogram statistic feature through the local feature library of the training set (i.e., the linear combination of the small number of local binary pattern features in the local feature library of the training set is used to represent the local histogram statistic feature, so that the dimension of the feature may be reduced, and then the complexity of subsequent calculation may be reduced), and the local reconstruction residual weighting identification is performed on the local sparse reconstruction representation result (i.e., the local sparse reconstruction representation result is weighted by constructing the weighting matrix, and classification and identification are performed on the weighting result using the residual) to obtain the object property of the target object, for example, the mood of the target object.

In some embodiments, as described above, when there are a plurality of objects in the video file, the target object may be determined from the plurality of objects in any one of the following ways. An object having the longest appearance time in the video file is determined as the target object. An object satisfying a user preference in the video file (for example, user feature data of the user are determined according to a historical viewing record of the user, and an object having the highest similarity with the user feature data as the object satisfying the user preference) is determined as the target object. An object related to a user interaction in the video file (for example, an object that the user once liked or forwarded) is determined as the target object.

Furthermore, When the multimedia file is the audio file, object properties (such as the gender, the age, and the mood) of the target object appearing in the audio file may be identified by the following way. For example, the gender of the target object may be determined according to a frequency of a sound (a frequency of a female pronunciation is high and a frequency of a male pronunciation is relatively low). The age of the target object may be identified according to the pitch (for example, a child usually has a tight vocal cord, and thus the pitch is high. As the age increases, the vocal cord becomes loose, and the pitch will gradually decrease). The mood of the target object is determined according to a speaking speed, a volume, and other information, for example, when the target object is angry, a corresponding volume will be loud, and the speaking speed will be relatively fast.

In step 104A, a pattern conversion is performed on a plurality of original subtitles associated with the multimedia file based on the content feature of the at least one dimension of the multimedia file to obtain a plurality of new subtitles.

Here, the plurality of new subtitles (patterns of the plurality of new subtitles may be the same, for example, all being obtained by performing the pattern conversion on the plurality of original subtitles associated with the multimedia file based on the identified style of the multimedia file) are used as a plurality of subtitles to be displayed in the human-computer interaction interface, i.e., as the plurality of subtitles sequentially displayed in the human-computer interaction interface in step 102.

In some embodiments, the above-mentioned step 104A may be implemented by the following way. A subtitle model is called based on a value corresponding to the content feature of the at least one dimension of the multimedia file and the plurality of original subtitles associated with the multimedia file to obtain a plurality of new subtitles. The subtitle model may be obtained as a generative model and the generative model is trained in a generative adversarial network formed by the generative model and a discriminative model.

Illustratively, taking the multimedia file as the video file as an example, after acquiring the content feature of the at least one dimension of the video file (for example, the style of the video file, which is assumed to be the comedy), the subtitle model may be called based on a value corresponding to the style of the video file and the plurality of original subtitles associated with the multimedia file (it is assumed that fonts of the plurality of original subtitles are all regular script) to obtain a plurality of new subtitles. For example, it is assumed that fonts of the plurality of new subtitles obtained after the pattern conversion are all YouYuan, and the font style is cartoon-like, adapting to the comedy, i.e., fonts of the plurality of subtitles sequentially displayed in the human-computer interaction interface are all YouYuan during playing the video file.

In some other embodiments, the subtitle model may also be trained by other ways, for example, the subtitle model may be trained separately, and embodiments of the present disclosure do not specifically limit a training way of the subtitle model.

Furthermore, the above-mentioned pattern conversion can be for the subtitle in the picture format, for example, a picture in an original font (for example, a picture with a font of a subtitle content being regular script) may be converted into a picture with a font adapted to the style of the video file, for example, a picture with the font of the subtitle content being STCaiyun. However, for the subtitle in the text format, the subtitle in the text format may firstly be converted into the subtitle in the picture format, and then the above-mentioned pattern conversion is performed.

As an alternative solution, the pattern conversion may be directly performed on the subtitle in the text format, for example, various properties (such as the font and the font size) of a subtitle in an original pattern may be firstly encoded to obtain a corresponding matrix vector. Then the pattern conversion is performed on the matrix vector (for example, the matrix vector and the value corresponding to the style of the video file may be input into the subtitle model) to obtain a new matrix vector (i.e., the matrix vector corresponding to a subtitle in a new pattern). Later decoding is performed based on the new matrix vector to obtain the subtitle in the new pattern (i.e., a subtitle in a pattern adapted to the style of the video file). Finally, the subtitle in the new pattern is used to replace the subtitle in the original pattern in the subtitle file, and the subtitle in the text format is more convenient for saving and updating, for example, correcting a text error.

In some other embodiments, for the case where the patterns of the plurality of subtitles associated with the multimedia file are different (i.e., the subtitle patterns may change during playing the whole multimedia file), step 103B and step 104B shown in FIG. 5B may be performed before performing step 102 shown in FIG. 3, which will be described in conjunction with the steps shown in FIG. 5B.

In step 103B, the content feature of at least one dimension of each segment in the multimedia file is acquired.

In some embodiments, the multimedia file may be firstly divided (a specific division process may refer to the above description, and embodiments of the present disclosure will not be repeated herein) to obtain the plurality of segments. Each segment is associated with at least one original subtitle, for example, a segment 1 is associated with an original subtitle 1 to an original subtitle 3, a segment 2 is associated with an original subtitle 4 and an original subtitle 5. Then the content feature of at least one dimension of each segment is acquired. An acquisition way of the content feature of the segment is similar to an acquisition way of the content feature of the multimedia file and may be implemented referring to the above-mentioned acquisition way of the content feature of the multimedia file, and embodiments of the present disclosure will not be repeated herein.

In step 104B, the following processing is performed for each segment. The pattern conversion is performed on at least one original subtitle associated with the segment based on the content feature of at least one dimension of the segment to obtain at least one new subtitle.

Here, after performing the pattern conversion on at least one original subtitle associated with each segment, at least one new subtitle corresponding to each segment may be combined to obtain a plurality of new subtitles. A sequence of the plurality of new subtitles is the same as a sequence of the plurality of original subtitles, and the plurality of new subtitles serve as the plurality of subtitles to be displayed in the human-computer interaction interface, i.e., the plurality of subtitles sequentially displayed in the human-computer interaction interface in step 102.

It should be noted that A process of performing the pattern conversion on at least one original subtitle associated with a segment obtained after a division is similar to a process of performing the pattern conversion on the plurality of original subtitles associated with the multimedia file and may refer to the above-mentioned process of performing the pattern conversion on the plurality of original subtitles associated with the multimedia file, and embodiments of the present disclosure will not be repeated herein.

In some embodiments, after acquiring the content feature of at least one dimension of each segment in the multimedia file, the following processing is performed for each segment. The subtitle model is called based on a value corresponding to the content feature of at least one dimension of the segment (such as a segment A) and at least one original subtitle associated with the segment A to obtain at least one new subtitle associated with the segment A. Then the at least one new subtitle associated with the segment A may also be used to replace the at least one original subtitle associated with the segment A stored in the subtitle file. Thus, during playing a subsequent multimedia file, for example, when playing to the segment A, the at least one new subtitle associated with the segment A may be read from the subtitle file and displayed in the human-computer interaction interface.

It should be noted that taking the content feature of the segment as a mood of the target object appearing in the video file as an example, during playing the video file, the mood of the target object may change, i.e., the mood belongs to the content feature of the dynamic dimension, and in different segments, the mood of the target object may be different. Therefore, when performing the pattern conversion based on the mood of the target object, after the pattern conversion, a pattern of new subtitles obtained through the conversion on original subtitles associated with different segments may be different, for example, in the segment 1, the mood of the target object is happy, and a font of the new subtitle obtained through the pattern conversion is YouYuan. In the segment 2, the mood of the target object is sad, and a font of the new subtitle obtained through the pattern conversion is STCaiyun, in other words, during playing the video file, the subtitle pattern will be adjusted correspondingly with a mood change of the target object so as to accurately and efficiently coordinate the subtitle with the video file at the visual perception level.

Furthermore, for the case where patterns of the plurality of subtitles associated with the same segment (for example, the segment A) are different, the segment A may also be divided again to obtain the plurality of sub-segments. Then the content feature of at least one dimension of each sub-segment in the segment A is acquired, and later the following processing is performed for each sub-segment. The subtitle model is called based on a value corresponding to the content feature of at least one dimension of the sub-segment and at least one original subtitle associated with the sub-segment to obtain at least one new subtitle associated with the sub-segment. Thus, when content features of at least one dimension corresponding to different sub-segments are different, patterns of the at least one new subtitle associated with different sub-segments are also different so as to realize that the subtitle pattern will also change during playing the same segment.

In some embodiments, the pattern of the subtitle may also be adapted to a fusion content feature obtained after fusing the content feature of a plurality of dimensions of the segment, and the above-mentioned at least one subtitle associated with the segment being displayed sequentially in the human-computer interaction interface based on the pattern adapted to the content feature of at least one dimension of the segment may be implemented by the following way. Content features of the plurality of dimensions of the segment are fused to obtain the fusion content feature. The pattern conversion is performed on at least one original subtitle associated with the segment based on the fusion content feature to obtain at least one new subtitle. The at least one new subtitle is used as at least one subtitle to be displayed in the human-computer interaction interface.

Illustratively, taking the multimedia file as the video file as an example, firstly, content features of the plurality of dimensions of the video file (such as the style of the video file and the hue of the video file) are acquired. Then the style of the video file and the hue of the video file (for example, summing a value corresponding to the style of the video file and a value corresponding to the hue of the video file) are fused to obtain the fusion content feature. Later the subtitle model is called based on a value corresponding to the fusion content feature and at least one original subtitle associated with the segment to obtain at least one new subtitle. A pattern of the new subtitle is adapted to the style of the video file and the hue of the video file at the same time. Thus, by comprehensively considering the content features of the plurality of dimensions of the video file, the subtitle finally presented can be more consistent with the video content, further improving the coordination between the subtitle and the video file at the visual perception level.

In some other embodiments, the pattern of the subtitle may also be related to the content of the multimedia file and the user feature data at the same time, for example, an emotion of the user (i.e., a viewer) on the multimedia file may be quantified, the user feature data of the user is determined according to the historical viewing record of the user, and then a preference degree of the user on the current multimedia file is calculated, and finally, the pattern of the subtitle is determined comprehensively based on the preference degree and the content feature of at least one dimension of the multimedia file. For example, a value corresponding to the preference degree and a value of the content feature of at least one dimension of the multimedia file may be fused (for example, adding the two values), and the subtitle model is called based on a value obtained by the fusion and a plurality of original subtitles associated with the multimedia file to obtain a plurality of new subtitles, i.e., a pattern of the plurality of new subtitles is adapted to the content of the multimedia file and the user feature data of the user at the same time. In other words, for the same multimedia file, subtitles displayed on user terminals of different users may also be different. Thus, by comprehensively considering the user's own factors and the content feature of the multimedia file, the coordination between the subtitle and the multimedia file at the visual perception level is further improved.

The subtitle processing method of a multimedia file provided by embodiments of the present disclosure displays the subtitle in a pattern related to the content of the multimedia file in the human-computer interaction interface during playing the multimedia file, and realizes a diversified display effect of multimedia file related information by enriching manifestations of the subtitle so as to accurately and efficiently coordinate the subtitle with the multimedia file at a visual perception level.

In the following, exemplary application of an embodiment of the present disclosure in an actual video file playing scenario will be described.

The subtitle processing method of a multimedia file provided by embodiments of the present disclosure may understand the content of the video file (such as mining character properties of a character appearing in the video file and an overall style of the video file) to generate a subtitle in a relevant style in real-time so as to accurately and efficiently coordinate the subtitle with the video file at the visual perception level.

The subtitle processing method of a multimedia file provided by embodiments of the present disclosure may be applied to subtitle generations of major video websites, and a subtitle in a style related to the identified content of the video file may be generated in real-time according to the content of the video file (including an identification of the style of the video file and an identification of character properties of the character appearing in the video file, such as identifying the age, gender, and mood of the character).

Figures 6A, 6B:
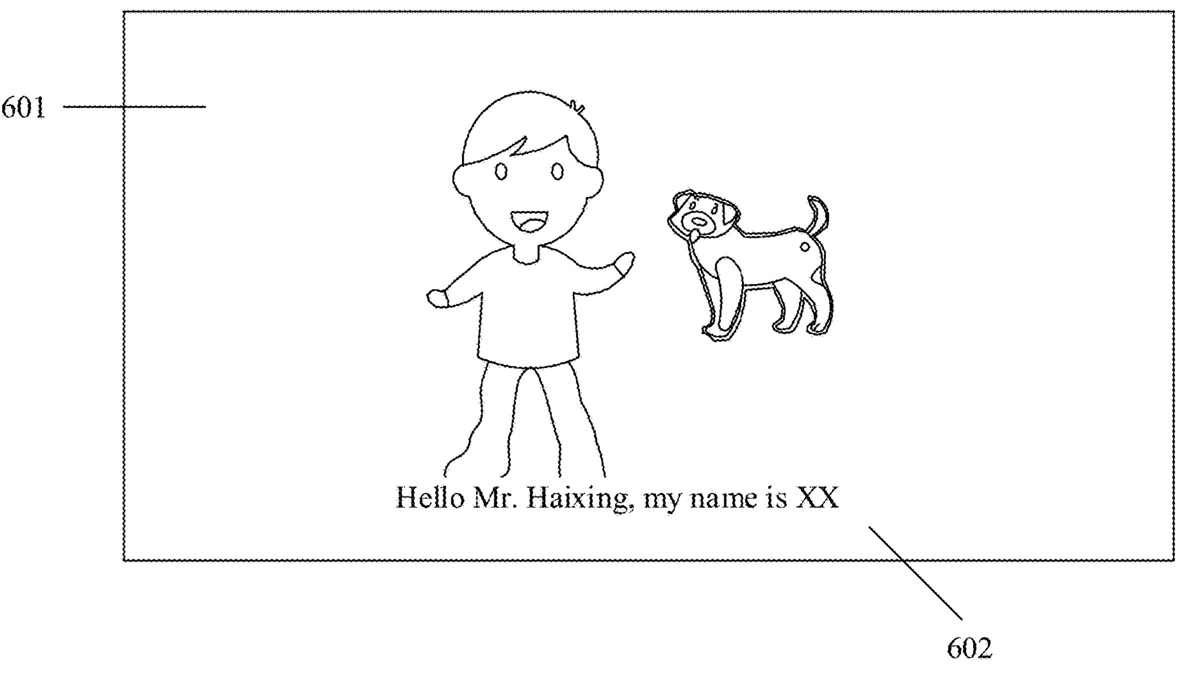
FIG. 6A to FIG. 6C are schematic diagrams of application scenarios of a subtitle processing method of a multimedia file provided by an embodiment of the present disclosure.
Figure 6C:
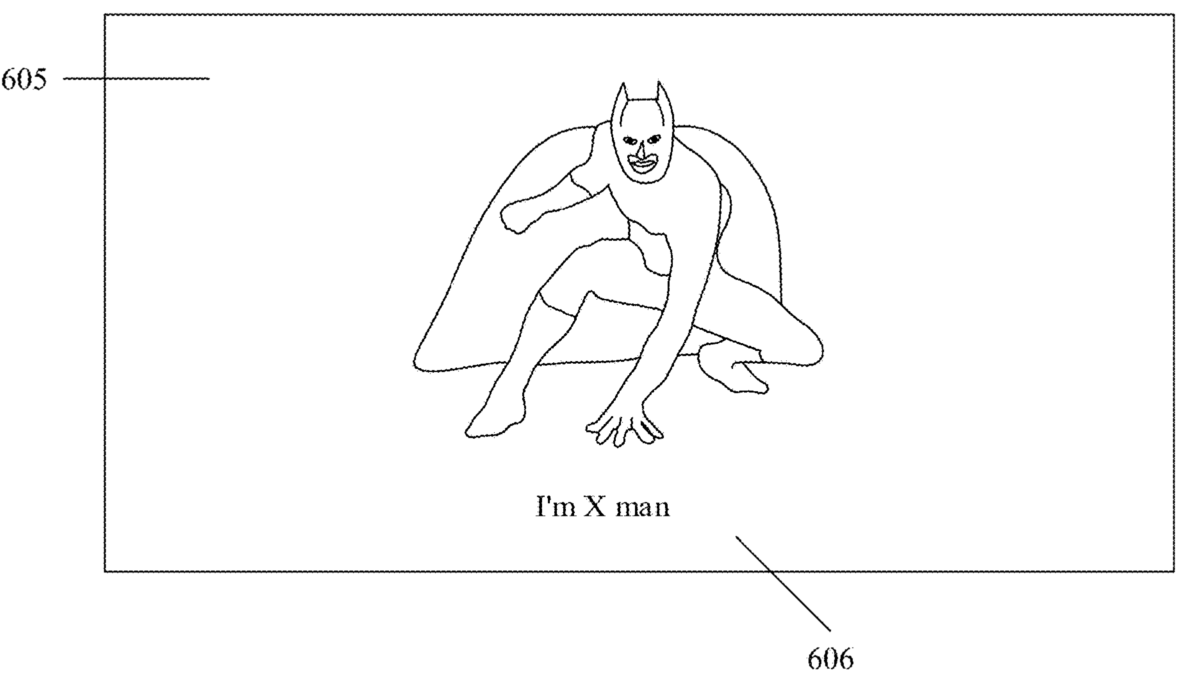

Illustratively, referring to FIG. 6A to FIG. 6C, FIG. 6A to FIG. 6C are schematic diagrams of application scenarios of a subtitle processing method of a multimedia file provided by an embodiment of the present disclosure. A style of a video 601 shown in FIG. 6A belongs to an animation, and an overall style is cute and cartoon-like. Therefore, a subtitle 602 associated with the video 601 is also in this style. Furthermore, a color of the subtitle 602 may also be adapted to a dominant hue of a background, for example, when the background is a sky, the color of the subtitle 602 may be blue. A style of a video 603 shown in FIG. 6B belongs to the comedy, and an overall style is funny. Therefore, a subtitle 604 associated with the video 603 is also cartoon-like and adapts to the style of the video 603. A style of a video 605 shown in FIG. 6C belongs to a hero film, and an overall style is serious. Therefore, a font style of a subtitle 606 associated with the video 605 is also more serious and decent. In other words, subtitles corresponding to videos in different styles have different patterns, and the pattern has a high degree of conformity with the style of the video so as to accurately and efficiently coordinate the subtitle with the video file at the visual perception level.

The subtitle processing method of a multimedia file provided by embodiments of the present disclosure mainly relates to two parts: understanding the content of the video file, and generating the video subtitle in the relevant style in real-time based on an understanding result of the video content. An understanding process of the content of the video will be firstly described below.

Figure 7:
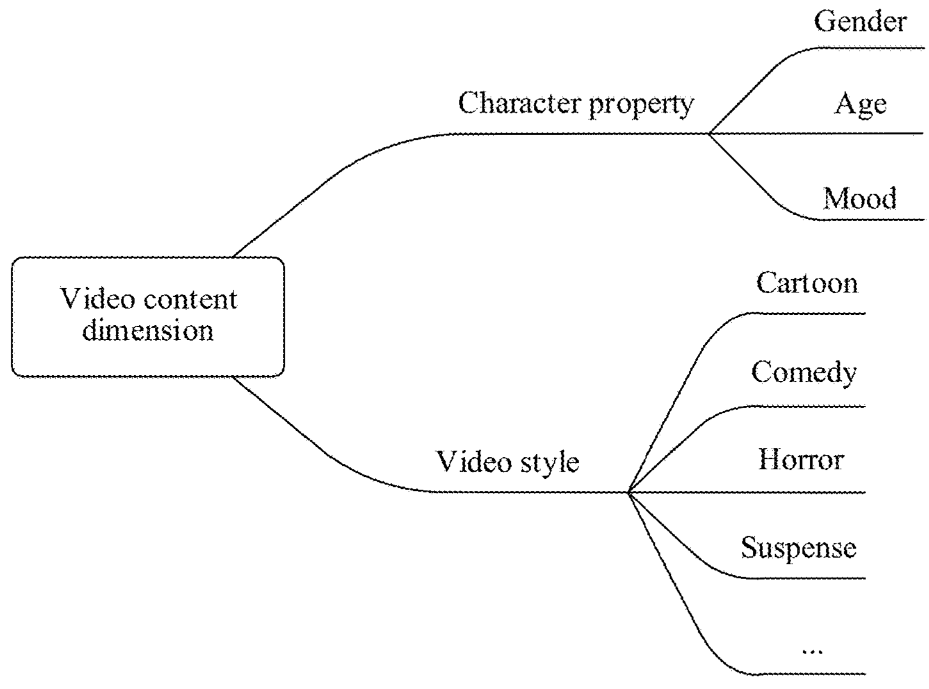
FIG. 7 is a schematic diagram of a video content dimension provided by an embodiment of the present disclosure.

Illustratively, referring to FIG. 7, FIG. 7 is a schematic diagram of a video content dimension provided by an embodiment of the present disclosure. As shown in FIG. 7, the understanding of the video content by an embodiment of the present disclosure mainly relates to the following several dimensions: the character property (including a character gender, age, mood, etc. of the character appearing in the video) and the video style (types of the video style may include cartoon, comedy, horror, suspense, etc.). An identification process of the character property will be firstly described below.

(1) The Character Property:

an identification of the character property includes an identification of the character gender, an identification of the character age, and identification of the character mood.

Figure 8:
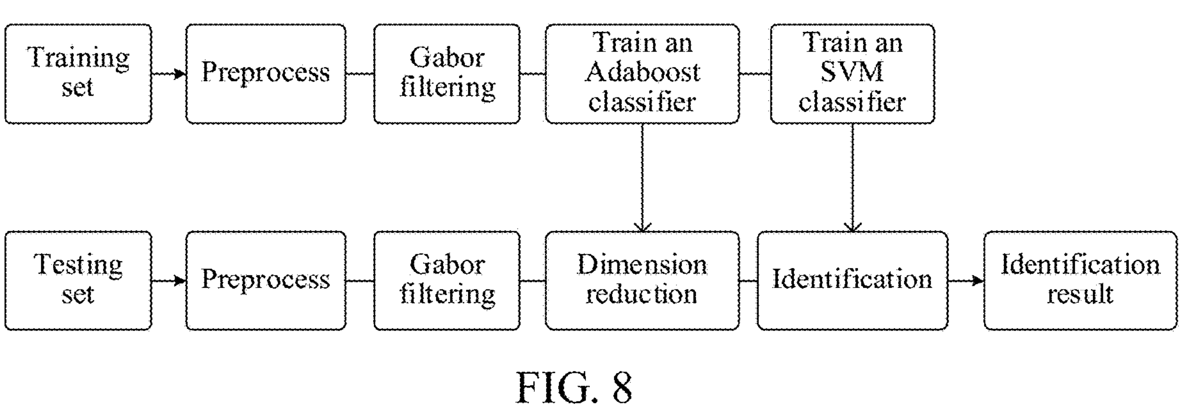
FIG. 8 is a schematic diagram of a character gender identification principle provided by an embodiment of the present disclosure.

Illustratively, the identification of the character gender may use (but is not limited to) a facial gender classification algorithm based on an Adaboost and the support vector machine (SVM). The Adaboost is an iterative algorithm, and its core idea is to train different classifiers (i.e., weak classifiers) for the same training set, and then these weak classifiers are assembled to form a stronger final classifier (i.e., a strong classifier). As shown in FIG. 8, the facial gender classification algorithm based on Adaboost+SVM is mainly divided into two stages. (a) Training Phase: firstly, the training set is preprocessed, then Gabor filtering is performed on a training set being preprocessed to obtain a wavelet (Gabor) feature of the training set being preprocessed, later an Adaboost classifier is trained based on the wavelet (Gabor) feature of the training set being preprocessed, and finally, a SVM classifier is trained based on a feature after the dimension reduction through the Adaboost classifier. (b) Testing Phase: firstly, a testing set is preprocessed, then Gabor filtering is performed on a testing set being preprocessed to obtain a wavelet (Gabor) feature of the testing set being preprocessed, later the dimension reduction is performed by a trained Adaboost classifier, and finally, a trained SVM classifier is called based on the feature after the dimension reduction to perform an identification, and an identification result (i.e., the gender of the character) is outputted.

Figure 9:
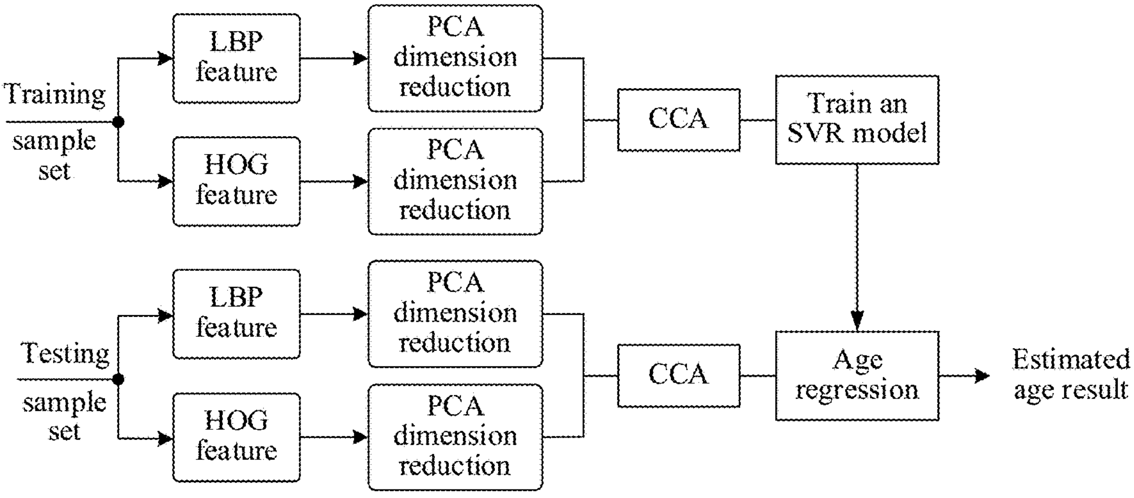
FIG. 9 is a schematic diagram of a character age identification principle provided by an embodiment of the present disclosure.

Illustratively, an age estimation of the character may use (but is not limited to) a facial age estimation algorithm that fuses features of the local binary pattern (LBP) and the histogram of oriented gradient (HOG). The LBP is the operator to describe the local texture feature of the image, which has significant advantages, such as rotation invariance and gray scale invariance. The HOG is the feature descriptor for object detection in computer vision and image processing and may be obtained by calculating and counting a histogram of oriented gradient of a local region of the image. As shown in FIG. 9, the facial age estimation algorithm mainly includes the following two stages. (a) Training Phase: firstly, local statistical features (such as an LBP feature and a HOG feature) of a human face closely related to an age change in a training sample set are extracted, then the dimension reduction is performed on extracted features, for example, dimension reductions may be performed on an extracted LBP feature and an extracted HOG feature using the principal component analysis (PCA), later two features after the dimension reduction are fused using the canonical correlation analysis (CCA), and finally, a support vector regression (SVR) model is trained based on a fusion result. The SVR model is a regression algorithm model, which creates an "interval zone" on two sides of a linear function and does not calculate the loss for all samples that fall into the interval zone. Only those outside the interval zone are calculated in a loss function, and then the model is optimized by minimizing an interval zone width and a total loss. (b) Testing Phase: firstly, the LBP feature and the HOG feature of the testing sample set are extracted, then dimension reductions are performed on the extracted LBP feature and the extracted HOG feature using the PCA method, later the two features after dimension reductions are fused using the CCA, and finally, a trained SVR model is called based on a fusion result to perform an age regression, and an estimated age result is outputted.

Figure 10:
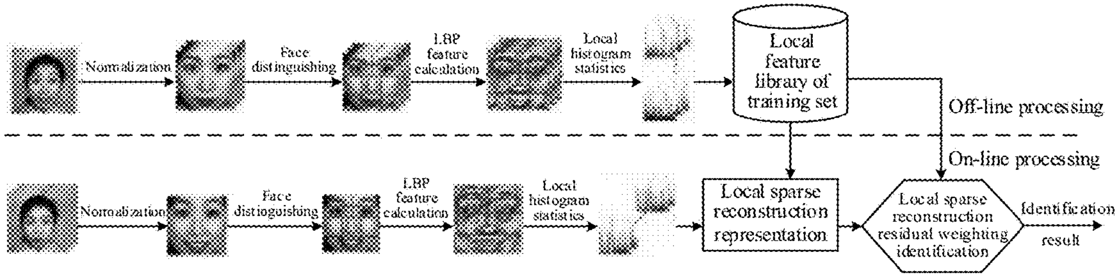
FIG. 10 is a schematic diagram of a character mood identification principle provided by an embodiment of the present disclosure.

Illustratively, the identification of the character mood may use (but is not limited to) a facial expression identification algorithm fusing the LBP feature and the local sparse representation, and as shown in FIG. 10, steps of the algorithm include the following two stages. (a) Training Phase: firstly, face images in the training set are normalized, then a face partition is performed on normalized face images, later an LBP feature of each face sub-region obtained after the partition is calculated, and feature vectors of this region are integrated using a local histogram statistic method to form a local feature library of the training set composed of local features of a specific face. (b) Testing Phase: for the face images in the testing set, the face image normalization, face partition, LBP feature calculation, and local histogram statistics are also performed. Finally, for the local histogram statistic feature of the face images in the testing set, the local sparse reconstruction representation is performed using the local feature library of the training set, and final facial expression classification and identification are performed using a local sparse reconstruction residual weighting method, and an identification result is outputted.

It should be noted that the training phase may be processed off-line and the testing phase may be processed on-line.

(2) Video Style

Figure 11:
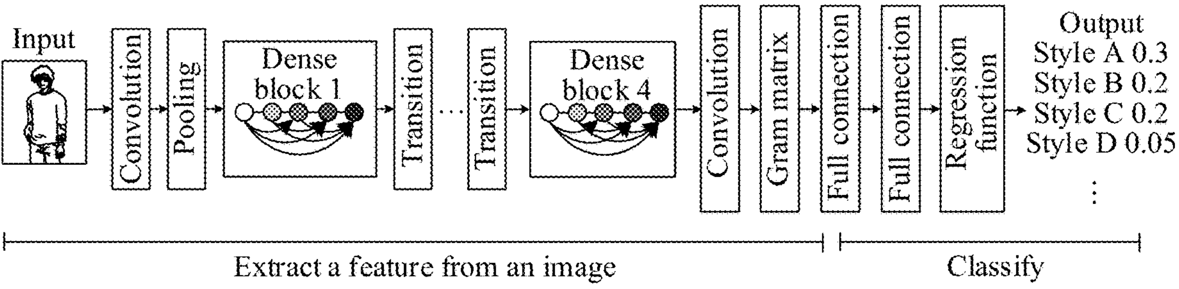
FIG. 11 is a schematic diagram of a video style identification principle provided by an embodiment of the present disclosure.

The video style may be identified using a convolutional neural network (CNN) model. Training data may be from a video file provided by a video website, and a style classification label (generally marked by an operator). As shown in FIG. 11, continuous L (L is a positive integer greater than 1) frame images in the video are inputted into a trained convolutional neural network model, and after obtaining a feature map corresponding to each frame of image through convolution, pooling, and N dense blocks (for example, 4 dense blocks, dense block 1 to dense block 4, where the dense block may be composed of a plurality of convolution blocks, and each block uses the same number of output channels), a Gram matrix is used to calculate a correlation between two feature maps (for example, feature maps after the convolution) so as to represent style information of the video. Then a full connection is performed on a correlation result outputted by the Gram matrix (for example, performing full connection twice), and finally, a full connection result is inputted to a regression function (for example, a Softmax function), probabilities corresponding to different styles are outputted, and a style corresponding to the maximum probability is determined as the style of the video.

A generation process of the subtitle is described below.

The generation of the subtitle may be implemented using a generative adversarial network (GAN) model, where the GAN contains two models: a generative model and a discriminative model. A final generation result is achieved by a mutual antagonism of the generative model and the discriminative model.

Figure 12:
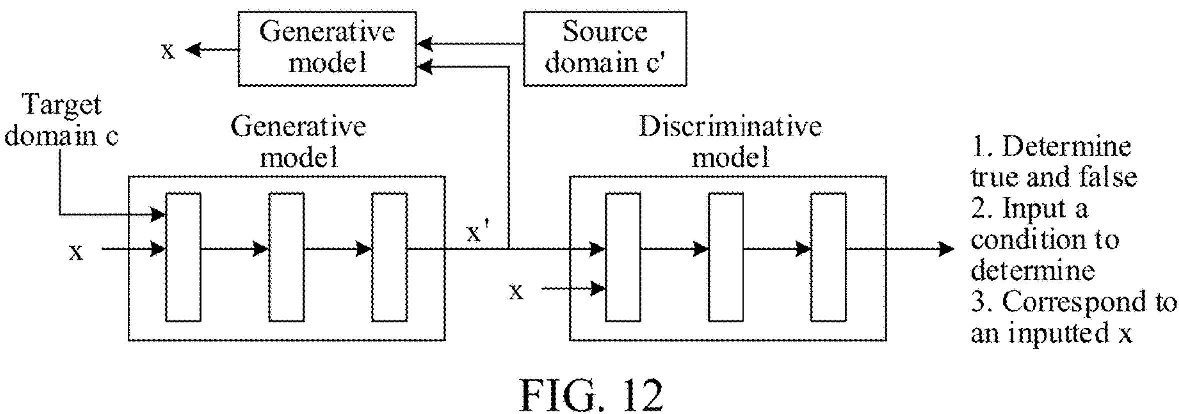
FIG. 12 is a schematic diagram of a training principle of a generative adversarial network model provided by an embodiment of the present disclosure.

Illustratively, referring to FIG. 12, FIG. 12 is a schematic diagram of a training principle of a generative adversarial network model provided by an embodiment of the present disclosure, and the specific algorithm flow is as follows.

(1) An original font picture x and a converted target domain c (the target domain c corresponding to the understood dimension of the video content) are combined and inputted into the generative model to generate a fake font picture x', i.e., a font picture adapted to the understood dimension of the video content is generated based on a value corresponding to the original font picture x and the target domain c, i.e., x'=G(x,c), where G is the generative model.

(2) The fake font picture)(rand the original font picture x are inputted into the discriminative model, where the discriminative model needs to determine whether the inputted font picture is real, and needs to determine from which domain the font picture comes.

(3) Domain information (i.e., a source domain c') corresponding to the generated fake font picture x and the original font picture x is combined and inputted into the generative model, which is required to be able to reconstruct the original font picture x.

It should be noted that if the original subtitle is in a text form, such as a subtitle file in srt and ass, the subtitle in the text format may be converted to the picture format, and then the above-mentioned processing may be performed.

The solution of generating the subtitle in real-time according to the video content provided by embodiments of the present disclosure has the following beneficial effects.

(1) The subtitle pattern has a high degree of conformity with the video content and is not abrupt.

(2) The subtitle pattern is more consistent with the video content, or the character feature of the character appearing in the video, and is more immersive.

(3) The subtitle pattern is automatically generated by the electronic device (such as the terminal device or the server), and there is no need to purchase the copyright of a subtitle library, saving a copyright cost.

Continuing with the following description of an exemplary structure of the subtitle processing apparatus of a multimedia file 465 provided by embodiments of the present disclosure implemented as software modules, in some embodiments, as shown in FIG. 2, the software modules stored in the subtitle processing apparatus 465 of the multimedia file of the memory 460 may include: the playing module 4651 and the display module 4652.

The playing module 4651 is configured to play the multimedia file in response to the play trigger operation. The multimedia file is associated with the plurality of subtitles, and types of the multimedia file include the video file and the audio file. The display module 4652 is configured to display the plurality of subtitles sequentially in the human-computer interaction interface during playing the multimedia file. The pattern of the plurality of subtitles is related to the content of the multimedia file.

In some embodiments, the display module 4652 is further configured to sequentially display a plurality of subtitles applying the pattern in the human-computer interaction interface. The pattern is adapted to the content feature of at least one dimension of the multimedia file, and the content feature of the at least one dimension includes: the style, the object, the scenario, the plot, and the hue.

In some embodiments, the subtitle processing apparatus of a multimedia file 465 further includes the acquisition module 4653 configured to acquire the content feature of at least one dimension of the multimedia file. The subtitle processing apparatus of a multimedia file 465 further includes the conversion module 4654 configured to perform the pattern conversion on the plurality of original subtitles associated with the multimedia file based on the content feature of at least one dimension to obtain the plurality of new subtitles. The plurality of new subtitles are used as the plurality of subtitles to be displayed in the human-computer interaction interface.

In some embodiments, the conversion module 4654 is further configured to call the subtitle model based on the value corresponding to the content feature of at least one dimension and the plurality of original subtitles associated with the multimedia file to obtain the plurality of new subtitles. The subtitle model is obtained as the generative model and is trained with the discriminative model to form the generative adversarial network.

In some embodiments, the multimedia file includes a plurality of segments, and types of the segment includes at least one of the following: the object segment, the scenario segment, and the plot segment. The display module 4652 is further configured to perform the following processing during playing each segment of the multimedia file. At least one subtitle associated with the segment is sequentially displayed in the human-computer interaction interface based on the pattern adapted to the content feature of the at least one dimension of the segment.

In some embodiments, the acquisition module 4653 is further configured to acquire the content feature of the static dimension of the segment. The content feature of the static dimension of the object segment includes at least one of the following object properties of the sounding object in the object segment: the role type, the gender, and the age. The feature of the static dimension of the scenario segment includes the scenario type of the scenario segment. The feature of the static dimension of the plot segment includes the ploy progress of the plot segment. The display module 4652 is further configured to display at least one subtitle associated with the segment synchronously in the human-computer interaction interface based on the pattern adapted to the content feature of the static dimension of the segment. The pattern keeps unchanged during playing the segment.

In some embodiments, the segment includes the plurality of sub-segments. The plurality of sub-segments have the content feature of the static dimension of the segment and the content feature of the dynamic dimension of the segment, and different sub-segments have different content features of the dynamic dimension. The display module 4652 is further configured to perform the following processing during playing each sub-segment of the segment. At least one subtitle associated with the sub-segment is displayed based on the pattern adapted to the content feature of the static dimension and the content feature of the dynamic dimension that the sub-segment has.

In some embodiments, the content feature of the static dimension of the object segment includes at least one of the following object properties: the role type, the gender, and the age of the sounding object in the object segment. The content feature of the dynamic dimension of the object segment includes the following object properties: the mood of the sounding object in the object segment. The content feature of the static dimension of the plot segment includes the plot type of the plot segment, and the content feature of the dynamic dimension of the plot segment includes at least one of the following: scenario types of different scenarios appearing in the plot segment, and object properties of different sounding objects appearing in the plot segment. The content feature of the static dimension of the scenario segment includes: the type of the scenario to which the scenario segment relates. The content feature of the dynamic dimension of the scenario segment includes at least one of the following: object properties of different sounding objects appearing in the scenario segment, and types of different plots appearing in the scenario segment.

In some embodiments, when the at least one dimension is a plurality of dimensions, the subtitle processing apparatus of a multimedia file 465 further includes the fusion module 4655 configured to fuse content features of the plurality of dimensions of the segment to obtain the fusion content feature. The conversion module 4654 is further configured to perform the pattern conversion on at least one original subtitle associated with the segment based on the fusion content feature to obtain at least one new subtitle. The at least one new subtitle is used as at least one subtitle to be displayed in the human-computer interaction interface.

In some embodiments, the acquisition module 4653 is further configured to call the content feature identification model to perform the content feature identification on the content of the multimedia file to obtain the content feature of at least one dimension of the multimedia file. The content feature identification model is obtained by training based on the sample multimedia file and a label labeled for the content of the sample multimedia file.

In some embodiments, when the multimedia file is the video file, the acquisition module 4653 is further configured to perform the following processing for the target object appearing in the video file. The target video frame where the target object is located is preprocessed. The feature extraction is performed on the target video frame being preprocessed to obtain the image feature corresponding to the target video frame. The dimension reduction is performed on the image feature, and the image features after the dimension reduction are classified by the trained classifier to obtain the object property of the target object.

In some embodiments, when the multimedia file is the video file, the acquisition module 4653 is further configured to perform the following processing for the target object appearing in the video file. The local binary pattern feature corresponding to the target video frame where the target object is located is extracted, and the dimension reduction is performed on the local binary pattern feature. The histogram of oriented gradient feature corresponding to the target video frame is extracted, and the dimension reduction is performed on the histogram of oriented gradient feature. The canonical correlation analysis is performed on the local binary pattern feature and the histogram of oriented gradient image after the dimension reduction to obtain the analysis result. The regression is performed on the analysis result to obtain the object property of the target object.

In some embodiments, when the multimedia file is the video file, the acquisition module 4653 is further configured to perform the following processing for the target object appearing in the video file. The target video frame where the target object is located is normalized, and the target video frame being normalized is partitioned to obtain the plurality of sub-regions. The local binary pattern feature corresponding to each of the sub-regions is extracted, and statistics are performed on the plurality of local binary pattern features to obtain the local histogram statistic feature corresponding to the target video frame. The local sparse reconstruction representation is performed on the local histogram statistic feature through the local feature library of the training set, and the local reconstruction residual weighting identification is performed on the local sparse reconstruction representation result to obtain the object property of the target object.

In some embodiments, when a plurality of objects appear in the video file, the subtitle processing apparatus of a multimedia file 465 further includes the determination module 4656 configured to determine the target object from the plurality of objects in any one of the following ways. The object having the longest appearance time in the video file is determined as the target object. The object satisfying the user preference in the video file is determined as the target object. The object related to the user interaction in the video file is determined as the target object.

It should be noted that the description of the apparatus in embodiments of the present disclosure is similar to the implementation of the above subtitle processing method of a multimedia file, has similar beneficial effects, and will not be repeated herein. Unnecessary technical details of the subtitle processing apparatus of a multimedia file provided by embodiments of the present disclosure may be understood according to the description of any one of FIG. 3, FIG. 5A, or FIG. 5B.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Embodiments of the present disclosure provide the computer program product or computer program including the computer instruction stored in the computer-readable storage medium. A processor of a computer device reads the computer instruction from the computer-readable storage medium, and the processor executes the computer instruction to cause the computer device to perform the above-mentioned subtitle processing method of a multimedia file according to embodiments of the present disclosure.

Figures 5A, 5B:
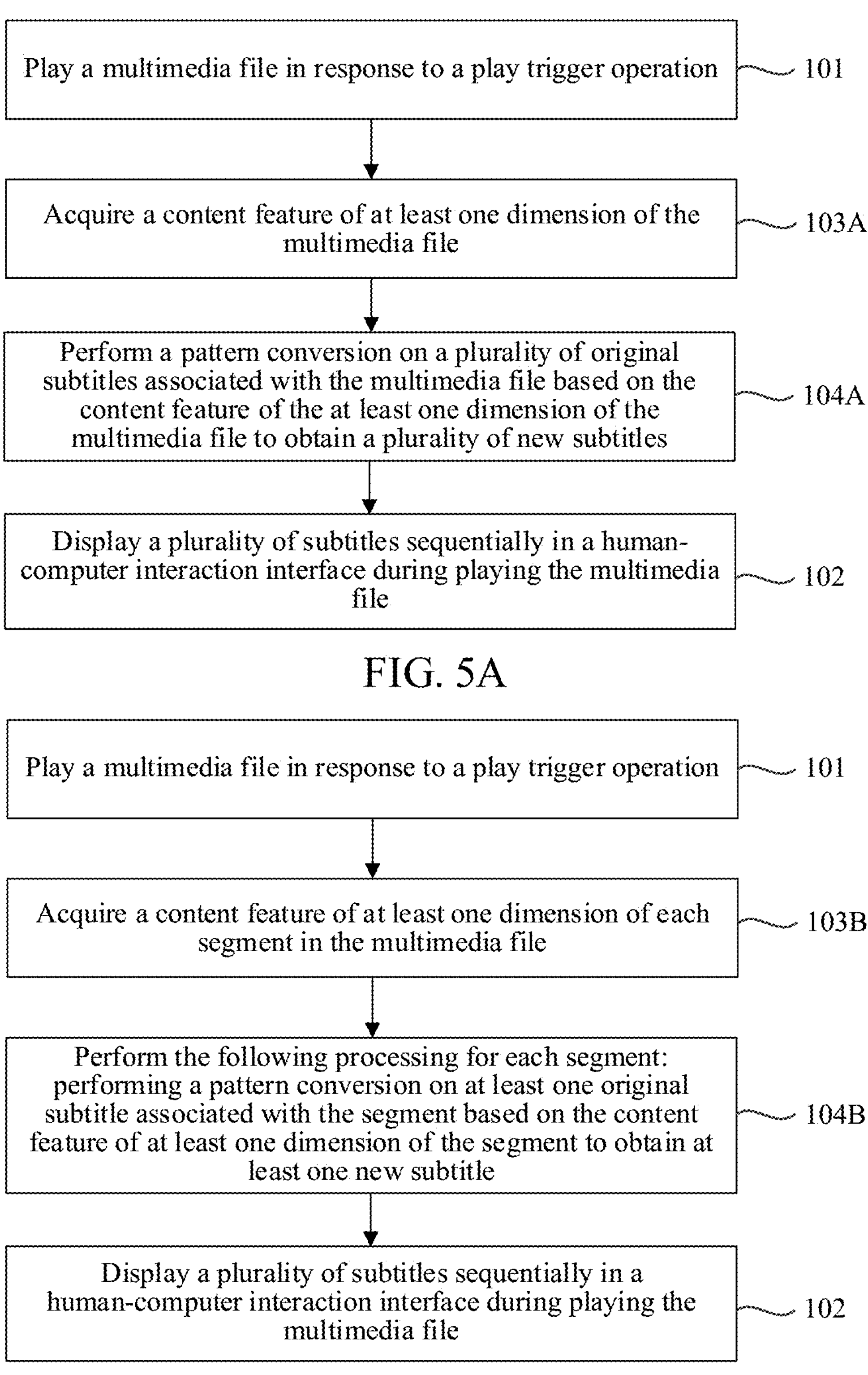
FIG. 5A is a flowchart of a subtitle processing method of a multimedia file provided by an embodiment of the present disclosure.
FIG. 5B is a flowchart of a subtitle processing method of a multimedia file provided by an embodiment of the present disclosure.

Embodiments of the present disclosure provide a computer-readable storage medium storing an executable instruction, the executable instruction when performed by the processor causes the processor to perform the subtitle processing method of a multimedia file provided by embodiments of the present disclosure, for example, the subtitle processing method of a multimedia file illustrated in FIG. 3, FIG. 5A, or FIG. 5B.

In some embodiments, the computer-readable storage medium may be a memory such as FRAM, ROM, PROM, EPROM, EEPROM, flash memory, magnetic surface memory, optical disk, or CD-ROM, and may also be various devices including one or any combination of the above-mentioned memories.

In some embodiments, the executable instruction may take the form of a program, software, the software module, the script, or the code, written in any form of programming language (including compiled or interpreted languages, or declarative or procedural languages), and may be deployed in any form, including as stand-alone programs or as modules, components, subroutines, or other units suitable for use in a computing environment.

Illustratively, the executable instruction may, but needs not, correspond to files in a file system, and may be stored in a part of a file that saves other programs or data, such as in one or more scripts in a hyper text markup language (HTML) document, in a single file dedicated to the program in question, or in a plurality of coordinated files (for example, files that store one or more modules, subprograms, or parts of code).

Illustratively, the executable instructions may be deployed to be performed on one computing device, on a plurality of computing devices at one site, or on a plurality of computing devices distributed across a plurality of sites and interconnected by a communication network.

In summary, embodiments of the present disclosure display the subtitle in the pattern related to the content of the multimedia file in the human-computer interaction interface during playing the multimedia file and realize the diversified display effect of multimedia file related information by enriching manifestations of the subtitle, which can apply to diversified subtitle display requirements of different application scenarios of the multimedia file, while improving the effect of information dissemination and the viewing experience of the user.

The above description is merely the embodiment of the present disclosure and is not intended to limit the scope of the present disclosure. Any modification, equivalent replacement, or improvement made within the spirit and principle of the present disclosure shall fall within the protection scope of the present disclosure.

What is claimed is:

1. A subtitle processing method of a multimedia file, the method being performed by an electronic device and comprising:

playing the multimedia file in response to a play trigger operation, the multimedia file being associated with a plurality of subtitles, a type of the multimedia file being a video file or an audio file, wherein the multimedia file comprises a plurality of segments, one of the segments comprises a plurality of sub-segments, each sub-segment has a content feature of a dynamic dimension of the sub-segment, and different sub-segments have different content features of the dynamic dimension; and displaying the plurality of subtitles sequentially in a human-computer interaction interface during playing the multimedia file, a pattern of the plurality of subtitles being related to a content of the multimedia file, comprising:

for one of the segments of the multimedia file:

displaying at least one subtitle associated with the segment sequentially in the human-computer interaction interface based on a pattern adapted to a content feature of at least one dimension of the segment, comprising:

for one sub-segment of the segment: displaying at least one subtitle associated with the sub-segment based on a pattern adapted to the content feature of the dynamic dimension that the sub-segment has.

2. The method according to claim 1, wherein the displaying the plurality of subtitles sequentially in a human-computer interaction interface, comprises:

displaying the plurality of subtitles to which the pattern is applied sequentially in the human-computer interaction interface, the pattern being adapted to a content feature of at least one dimension of the multimedia file, and the content feature of the at least one dimension comprising: a style, an object, a scenario, a plot, and a hue.

3. The method according to claim 2, wherein the method further comprises:

acquiring the content feature of the at least one dimension of the multimedia file; and performing a pattern conversion on a plurality of original subtitles associated with the multimedia file based on the content feature of the at least one dimension to obtain a plurality of new subtitles, the plurality of new subtitles being used as the plurality of subtitles to be displayed in the human-computer interaction interface.

4. The method according to claim 3, wherein the performing a pattern conversion on a plurality of original subtitles associated with the multimedia file based on the content feature of the at least one dimension to obtain a plurality of new subtitles, comprises:

calling a subtitle model based on a value corresponding to the content feature of the at least one dimension and the plurality of original subtitles associated with the multimedia file to obtain a plurality of new subtitles, the subtitle model being a generative model, wherein the generative model is trained in a generative adversarial network formed by the generative model and a discriminative model.

5. The method according to claim 1, wherein types of the segments comprise at least one of the following: an object segment, a scenario segment, and a plot segment.

6. The method according to claim 5, wherein the displaying at least one subtitle associated with the segment sequentially in the human-computer interaction interface based on a pattern adapted to a content feature of at least one dimension of the segment, comprises:

acquiring a content feature of a static dimension of the segment, a content feature of a static dimension of the object segment comprising at least one of the following object properties of a sounding object in the object segment: a role type, a gender, and an age; a feature of a static dimension of the scenario segment comprising a scenario type of the scenario segment; a feature of a static dimension of the plot segment comprising a plot progress of the plot segment; and displaying at least one subtitle associated with the segment synchronously in the human-computer interaction interface based on a pattern adapted to the content feature of the static dimension of the segment, the pattern keeping unchanged during playing the segment.

7. The method according to claim 5, wherein the plurality of sub-segments have a content feature of a static dimension of the segment and the content feature of the dynamic dimension of the segment; and the displaying at least one subtitle associated with the segment sequentially in the human-computer interaction interface based on a pattern adapted to a content feature of at least one dimension of the segment, comprises: for one sub-segment of the segment:

displaying at least one subtitle associated with the sub-segment based on the pattern adapted to the content feature of the static dimension and the content feature of the dynamic dimension that the sub-segment has.

8. The method according to claim 7, wherein the content feature of the static dimension of the object segment comprises at least one of the following object properties: a role type, a gender, and an age of the sounding object in the object segment; the content feature of the dynamic dimension of the object segment comprises the following object properties: a mood of the sounding object in the object segment;

a content feature of the static dimension of the plot segment comprises a plot type of the plot segment, and a content feature of a dynamic dimension of the plot segment comprises at least one of the following: scenario types of different scenarios appearing in the scenario segment, and object properties of different sounding objects appearing in the scenario segment; and a content feature of the static dimension of the scenario segment comprises: a type of a scenario to which the scenario segment relates; a content feature of a dynamic dimension of the scenario segment comprises at least one of the following: object properties of different sounding objects appearing in the scenario segment, and types of different plots appearing in the scenario segment.

9. The method according to claim 1, wherein when the at least one dimension is a plurality of dimensions, the displaying at least one subtitle associated with the segment sequentially in the human-computer interaction interface based on a pattern adapted to a content feature of at least one dimension of the segment, comprises:

fusing content features of the plurality of dimensions of the segment to obtain a fusion content feature; and performing a pattern conversion on at least one original subtitle associated with the segment based on the fusion content feature to obtain at least one new subtitle, the at least one new subtitle being used as the at least one subtitle to be displayed in the human-computer interaction interface.

10. The method according to claim 3, wherein the acquiring the content feature of the at least one dimension of the multimedia file, comprises:

calling a content feature identification model to perform a content feature identification on the content of the multimedia file to obtain a content feature of at least one dimension of the multimedia file;

the content feature identification model being obtained by training based on a sample multimedia file and a label labeled for a content of the sample multimedia file.

11. The method according to claim 3, wherein when the multimedia file is the video file, the acquiring the content feature of the at least one dimension of the multimedia file, comprises:

performing the following processing for a target object appearing in the video file:

preprocessing a target video frame where the target object is located;

performing a feature extraction on the target video frame being preprocessed to obtain an image feature corresponding to the target video frame; and performing a dimension reduction on the image feature, and classifying the image features after the dimension reduction through a trained classifier to obtain an object property of the target object.

12. The method according to claim 3, wherein when the multimedia file is the video file, the acquiring the content feature of the at least one dimension of the multimedia file, comprises:

performing the following processing for a target object appearing in the video file:

extracting a local binary pattern feature corresponding to the target video frame where the target object is located, and performing a dimension reduction on the local binary pattern feature;

extracting a histogram of oriented gradient feature corresponding to the target video frame, and performing a dimension reduction on the histogram of oriented gradient feature;

performing a canonical correlation analysis on the local binary pattern feature and the histogram of oriented gradient image after the dimension reduction to obtain an analysis result; and performing a regression on the analysis result to obtain the object property of the target object.

13. The method according to claim 3, wherein when the multimedia file is the video file, the acquiring the content feature of the at least one dimension of the multimedia file, comprises:

performing the following processing for a target object appearing in the video file:

normalizing the target video frame where the target object is located, and partitioning the target video frame being normalized to obtain a plurality of sub-regions;

extracting local binary pattern features corresponding to the sub-regions, and performing statistics on a plurality of the local binary pattern features to obtain a local histogram statistic feature corresponding to the target video frame; and performing a local sparse reconstruction representation on the local histogram statistic feature through a local feature library of a training set, and performing a local reconstruction residual weighting identification on a local sparse reconstruction representation result to obtain the object property of the target object.

14. The method according to claim 11, wherein when a plurality of objects appear in the video file, determining the target object from the plurality of objects in one of the following ways:

determining an object having a longest appearance time in the video file as the target object;

determining an object satisfying a user preference in the video file as the target object; and determining an object related to a user interaction in the video file as the target object.

15. A subtitle processing apparatus of a multimedia file, comprising:

at least one memory, configured to store an executable instruction; and at least one processor, configured to execute the executable instruction stored in the at least one memory and perform:

playing the multimedia file in response to a play trigger operation, the multimedia file being associated with a plurality of subtitles, a type of the multimedia file being a video file or an audio file, wherein the multimedia file comprises a plurality of segments, one of the segments comprises a plurality of sub-segments, each sub-segment has a content feature of a dynamic dimension of the sub-segment, and different sub-segments have different content features of the dynamic dimension; and displaying the plurality of subtitles sequentially in a human-computer interaction interface during playing the multimedia file, a pattern of the plurality of subtitles being related to a content of the multimedia file, comprising:

for one of the segments of the multimedia file:

displaying at least one subtitle associated with the segment sequentially in the human-computer interaction interface based on a pattern adapted to a content feature of at least one dimension of the segment, comprising:

for one sub-segment of the segment: displaying at least one subtitle associated with the sub-segment based on a pattern adapted to the content feature of the dynamic dimension that the sub-segment has.

16. The apparatus according to claim 15, wherein the displaying the plurality of subtitles sequentially in a human-computer interaction interface, comprises:

displaying the plurality of subtitles to which the pattern is applied sequentially in the human-computer interaction interface, the pattern being adapted to a content feature of at least one dimension of the multimedia file, and the content feature of the at least one dimension comprising: a style, an object, a scenario, a plot, and a hue.

17. The apparatus according to claim 16, wherein the at least one processor is further configured to perform:

acquiring the content feature of the at least one dimension of the multimedia file; and performing a pattern conversion on a plurality of original subtitles associated with the multimedia file based on the content feature of the at least one dimension to obtain a plurality of new subtitles, comprising:

calling a subtitle model based on a value corresponding to the content feature of the at least one dimension and the plurality of original subtitles associated with the multimedia file to obtain a plurality of new subtitles, the subtitle model being a generative model, wherein the generative model is trained in a generative adversarial network formed by the generative model and a discriminative model.

18. The apparatus according to claim 15, wherein types of the segment comprise at least one of the following: an object segment, a scenario segment, and a plot segment.

19. The apparatus according to claim 18, wherein the displaying at least one subtitle associated with the segment sequentially in the human-computer interaction interface based on a pattern adapted to a content feature of at least one dimension of the segment, comprises:

acquiring a content feature of a static dimension of the segment, a content feature of a static dimension of the object segment comprising at least one of the following object properties of a sounding object in the object segment: a role type, a gender, and an age; a feature of a static dimension of the scenario segment comprising a scenario type of the scenario segment; a feature of a static dimension of the plot segment comprising a plot progress of the plot segment; and displaying at least one subtitle associated with the segment synchronously in the human-computer interaction interface based on a pattern adapted to the content feature of the static dimension of the segment, the pattern keeping unchanged during playing the segment.

20. A non-transitory computer-readable storage medium storing an executable instruction, the executable instruction when executed by at least one processor, cause the at least one processor to perform:

playing the multimedia file in response to a play trigger operation, the multimedia file being associated with a plurality of subtitles, a type of the multimedia file being a video file or an audio file, wherein the multimedia file comprises a plurality of segments, one of the segments comprises a plurality of sub-segments, each sub-segment has a content feature of a dynamic dimension of the sub-segment, and different sub-segments have different content features of the dynamic dimension; and displaying the plurality of subtitles sequentially in a human-computer interaction interface during playing the multimedia file, a pattern of the plurality of subtitles being related to a content of the multimedia file, comprising:

for one of the segments of the multimedia file:

displaying at least one subtitle associated with the segment sequentially in the human-computer interaction interface based on a pattern adapted to a content feature of at least one dimension of the segment, comprising:

for one sub-segment of the segment: displaying at least one subtitle associated with the sub-segment based on a pattern adapted to the content feature of the dynamic dimension that the sub-segment has.

* * * * *